(12) United States Patent
Warner

(10) Patent No.: US 10,899,636 B2
(45) Date of Patent: Jan. 26, 2021

(54) MAGNETIZATION AND MANIPULATION OF HYDROPHOBIC ABSORBENTS

(71) Applicant: Arden A. Warner, Oswego, IL (US)

(72) Inventor: Arden A. Warner, Oswego, IL (US)

(73) Assignee: Natural Science, LLC, Big Rock, IL (US)

( * ) Notice: Subject to any disclaimer, the term of this patent is extended or adjusted under 35 U.S.C. 154(b) by 0 days.

(21) Appl. No.: 16/513,152

(22) Filed: Jul. 16, 2019

(65) Prior Publication Data

US 2019/0337822 A1 Nov. 7, 2019

Related U.S. Application Data

(63) Continuation-in-part of application No. 15/700,720, filed on Sep. 11, 2017, now Pat. No. 10,781,114, and
(Continued)

(51) Int. Cl.
*C02F 1/40* (2006.01)
*B03C 1/32* (2006.01)
(Continued)

(52) U.S. Cl.
CPC ............ *C02F 1/40* (2013.01); *B01D 17/0202* (2013.01); *B01D 17/06* (2013.01); *B03C 1/01* (2013.01);
(Continued)

(58) Field of Classification Search
CPC ...... E02B 15/04; E02B 15/041; E02B 15/045; E02B 15/046; E02B 15/047; E02B 15/048; E02B 15/10; E02B 15/101; C02F 1/28; C02F 1/283; C02F 1/288; C02F 1/42; C02F 1/48; C02F 1/481; C02F 1/482; C02F 1/484; C02F 1/485; C02F 1/488;
(Continued)

(56) References Cited

U.S. PATENT DOCUMENTS 3,635,819 A   1/1972  Kaiser
4,187,187 A *  2/1980  Turbeville ............. C02F 1/681
                                              252/62.54
(Continued)

FOREIGN PATENT DOCUMENTS

BE    1009136      12/1996
CN   103965835     8/2014
(Continued)

OTHER PUBLICATIONS

International Search Report; dated Dec. 14, 2017 with respect to PCT/US2017/055140.
(Continued)

*Primary Examiner* — David C Mellon
(74) *Attorney, Agent, or Firm* — Brian R. Michalek

(57) ABSTRACT

The present invention includes a method of controlling an oil spill through introduction of a plurality of magnetizable particles into the oil spill in an amount sufficient to form a colloidal mixture. An absorbent is, also introduced into the oil spill to form an absorbent mixture. A magnetic field can be applied to the system to move, manipulate, or otherwise control the absorbent mixture in response to movement of the magnetic field.

12 Claims, 18 Drawing Sheets

Related U.S. Application Data a continuation of application No. 15/662,451, filed on Jul. 28, 2017, now abandoned.

(60) Provisional application No. 62/698,619, filed on Jul. 16, 2018.

(51) Int. Cl.

| | | |
|---|---|---|
| *B01D 17/06* | (2006.01) | |
| *B03C 1/033* | (2006.01) | |
| *B03C 1/24* | (2006.01) | |
| *B03C 1/20* | (2006.01) | |
| *C02F 1/48* | (2006.01) | |
| *B01D 17/02* | (2006.01) | |
| *B03C 1/28* | (2006.01) | |
| *B03C 1/253* | (2006.01) | |
| *B03C 1/18* | (2006.01) | |
| *B03C 1/01* | (2006.01) | |
| *E02B 15/04* | (2006.01) | |
| *C02F 1/28* | (2006.01) | |
| *C02F 101/32* | (2006.01) | |

(52) U.S. Cl.
CPC .......... *B03C 1/0332* (2013.01); *B03C 1/0335* (2013.01); *B03C 1/18* (2013.01); *B03C 1/20* (2013.01); *B03C 1/24* (2013.01); *B03C 1/253* (2013.01); *B03C 1/286* (2013.01); *B03C 1/288* (2013.01); *B03C 1/32* (2013.01); *C02F 1/488* (2013.01); *E02B 15/041* (2013.01); *C02F 1/281* (2013.01); *C02F 1/487* (2013.01); *C02F 2101/325* (2013.01); *E02B 15/048* (2013.01)

(58) Field of Classification Search
CPC .. C02F 1/40; C02F 2303/18; C02F 2201/008; C02F 1/286; C02F 1/681; C02F 2103/007; C02F 2101/32; C02F 2101/325; C02F 1/281; C02F 1/487; B01J 20/28009; B01D 17/06; B01D 17/0202; B01D 17/041; B01D 17/02; B03C 1/22; B03C 1/035; B03C 2201/18; B03C 1/32; B03C 1/0332; B03C 1/24; B03C 1/20; B03C 1/288; B03C 1/286; B03C 1/253; B03C 1/18; B03C 1/0335; B03C 1/01
See application file for complete search history.

(56) References Cited

U.S. PATENT DOCUMENTS

| | | | |
|---|---|---|---|
| 5,772,877 A | 6/1998 | Dvorchik et al. | |
| 7,303,679 B2 | 12/2007 | Ulicny | |
| 8,795,519 B2 | 8/2014 | Warner | |
| 8,945,393 B2 | 2/2015 | Zahn et al. | |
| 9,249,549 B2 | 2/2016 | Warner | |
| 9,797,538 B2 | 10/2017 | Warner | |
| 2004/0108276 A1* | 6/2004 | Christodoulou | B01J 20/10 210/691 |
| 2005/0139550 A1 | 6/2005 | Ulicny et al. | |
| 2011/0309026 A1* | 12/2011 | Warner | C02F 1/488 210/695 |
| 2014/0102988 A1 | 4/2014 | Viswanathan | |
| 2016/0146395 A1 | 5/2016 | Warner | |

FOREIGN PATENT DOCUMENTS

| | | |
|---|---|---|
| CN | 106496642 | 3/2017 |
| CN | 107163281 | 9/2017 |
| DE | 3146847 | 6/1983 |
| DE | 3347988 | 6/1987 |
| RU | 2184707 | 7/2002 |
| WO | 9855197 | 12/1998 |
| WO | 2009076720 | 6/2009 |
| WO | 2012035773 | 3/2012 |
| WO | 2014008554 | 1/2014 |
| WO | 2017045021 | 3/2017 |
| WO | 2017130032 | 8/2017 |
| WO | 2018006959 | 1/2018 |

OTHER PUBLICATIONS

Written Opinion; dated Dec. 14, 2017 with respect to PCT/US2017/055140.

* cited by examiner

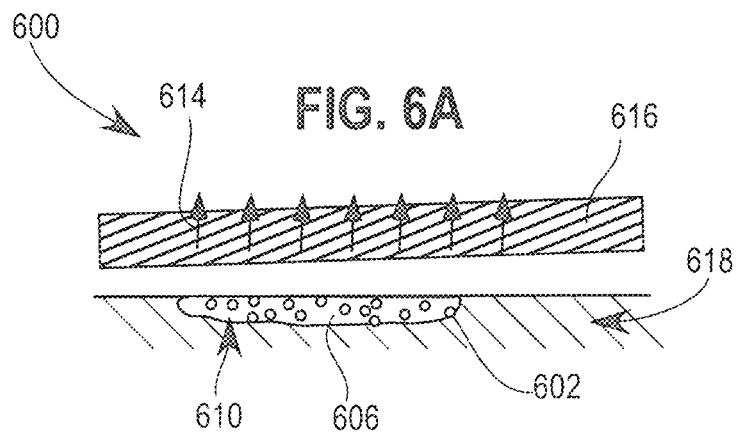
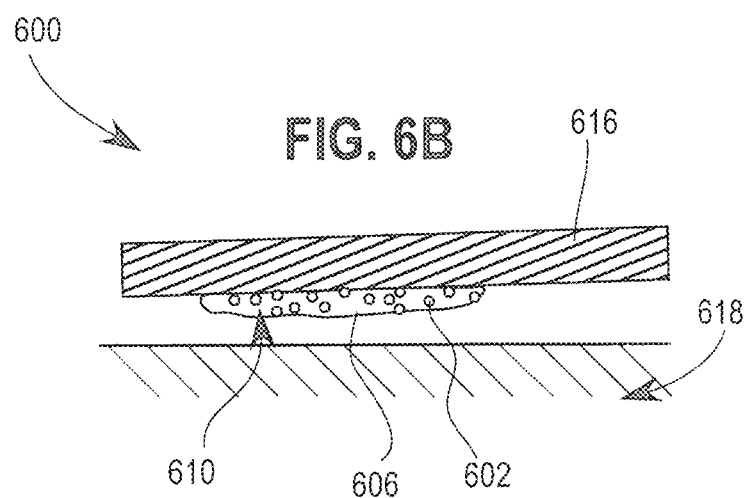

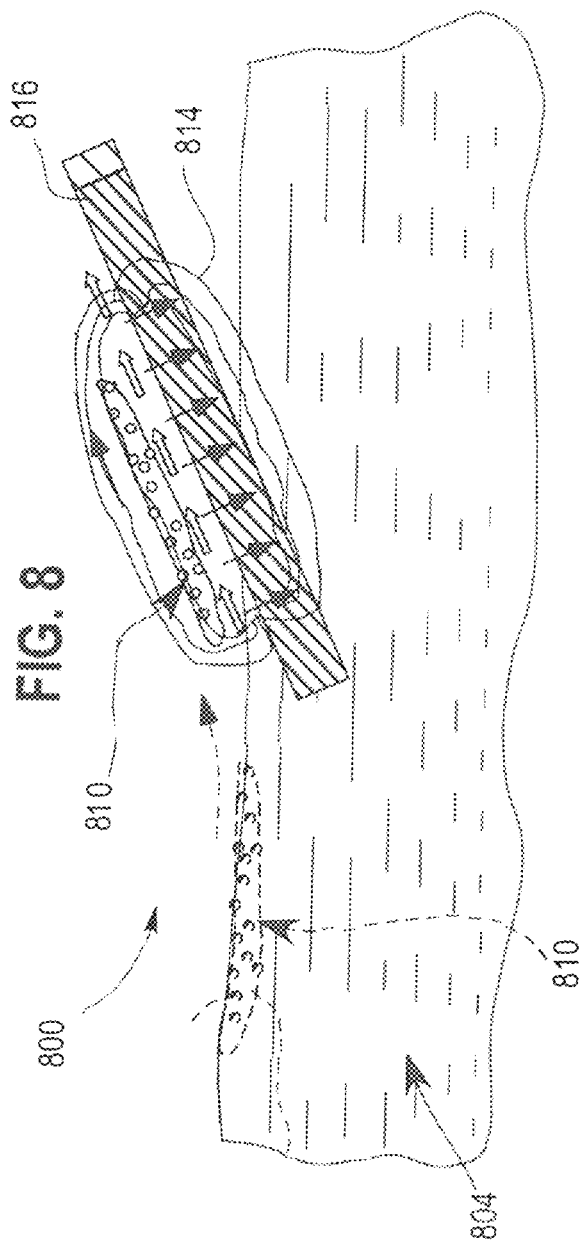

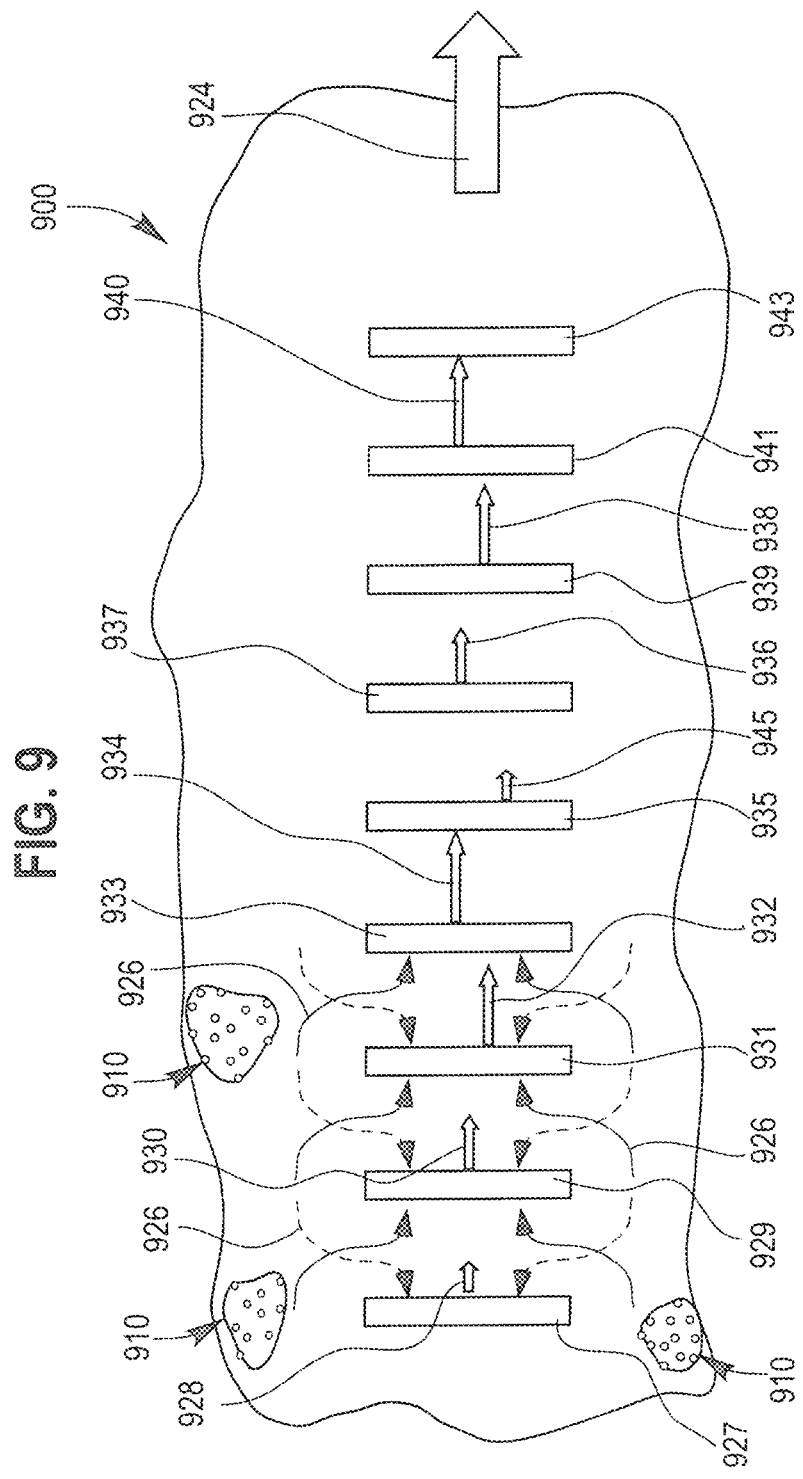

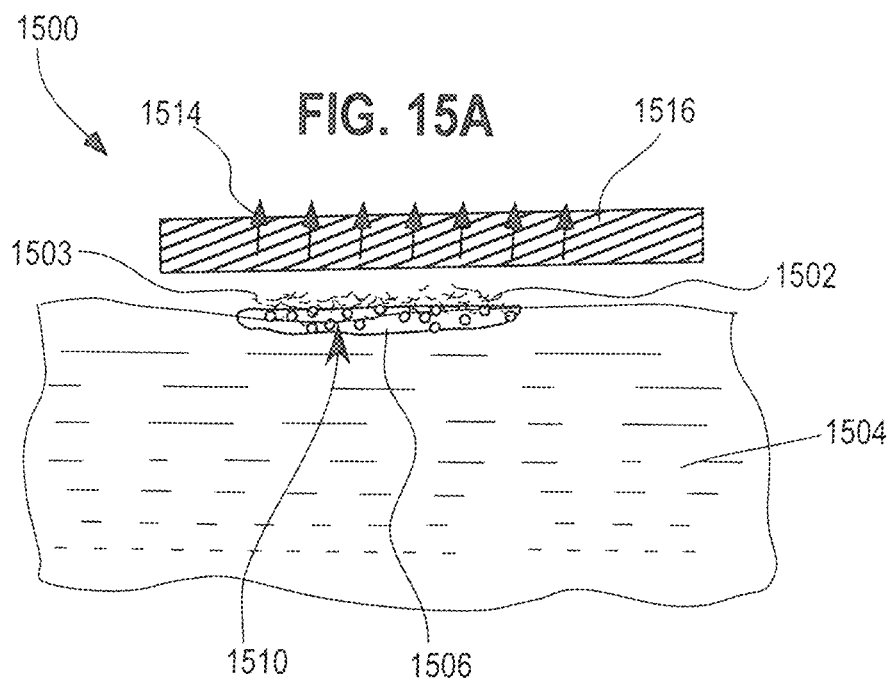
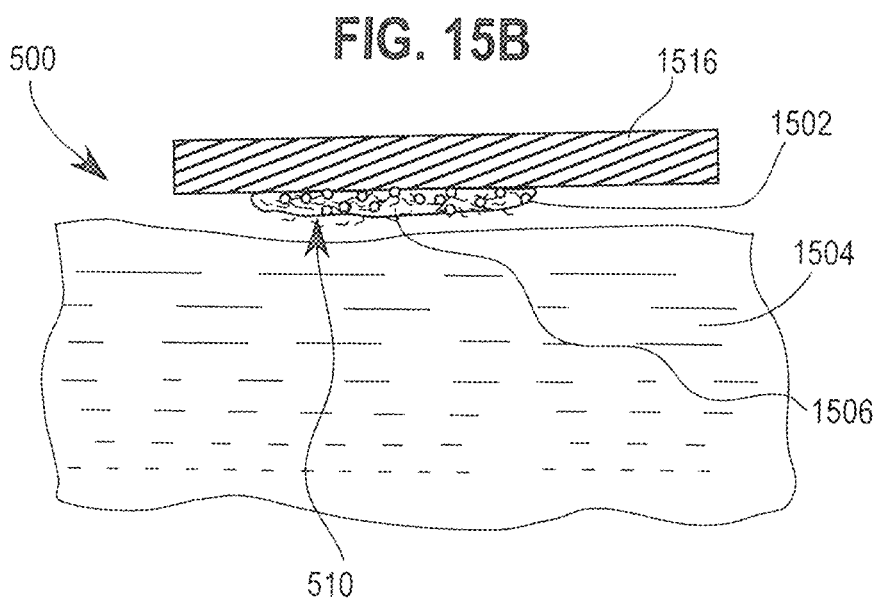

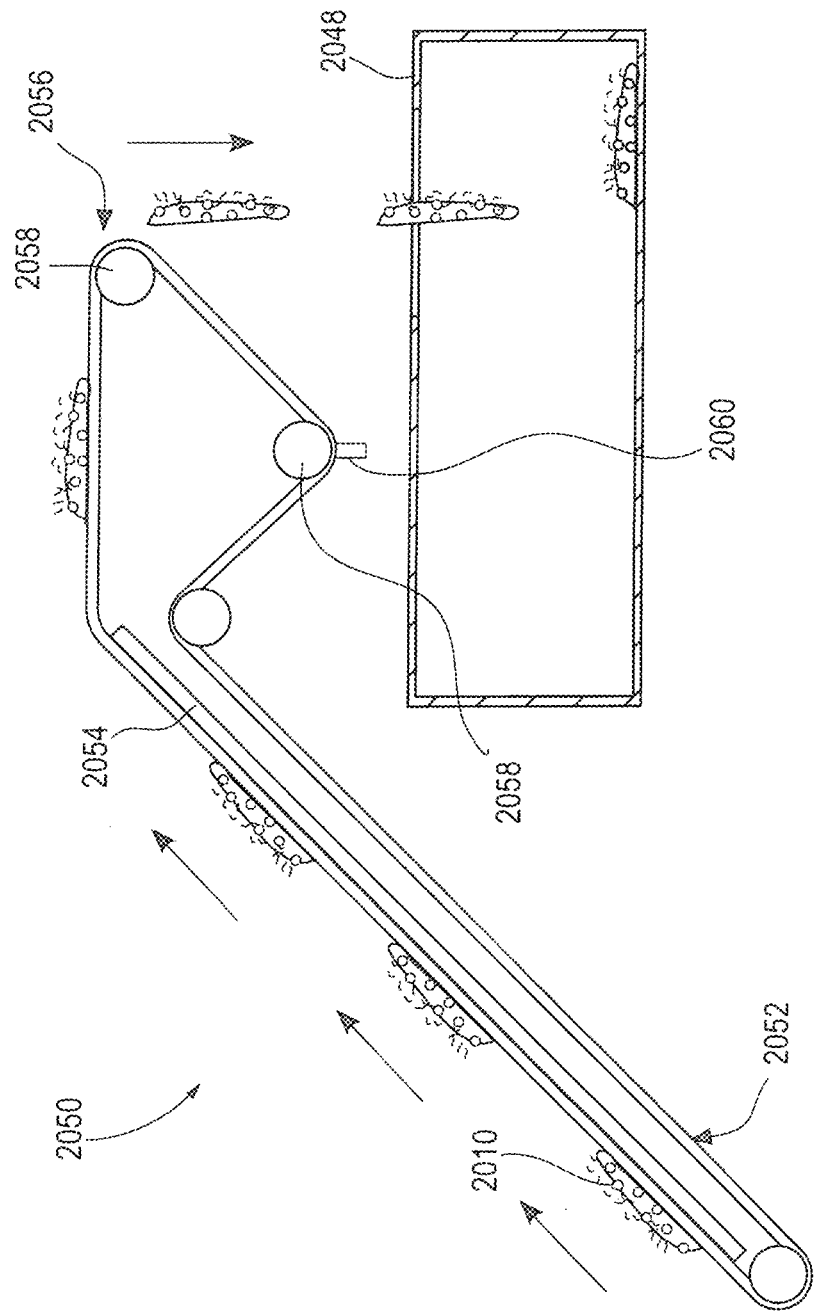

MAGNETIZATION AND MANIPULATION OF HYDROPHOBIC ABSORBENTS

CROSS-REFERENCE TO RELATED APPLICATION

This application claims priority to U.S. Provisional Application No. 62/698,619 filed on Jul. 16, 2018 which is hereby incorporated by reference. This patent application is also a continuation-in-part of U.S. application Ser. No. 15/700,720, entitled "Electromagnetic Pulsed-Wave System For Oil Manipulation" which was filed on Sep. 11, 2017 which is a continuation of application of U.S. application Ser. No. 15/662,451, entitled "Magnetization Control and Transportation of Oil" which was filed on Jul. 28, 2017 and which are hereby incorporated by reference. This patent application claims the benefit of the above-referenced applications.

FIELD OF THE INVENTION

This invention relates to the use of magnetic fields for the manipulation of oil. In particular, it relates to the seeding of oil with magnetizable particles, introducing a magnetizable organic absorbent material to the oil magnetically removing oil from water, reducing the diffusion rate of oil on water, magnetically lifting oil from water and nonporous surfaces, as well as separating the magnetic material from the oil.

BACKGROUND OF THE INVENTION

Fuels such as oil, petroleum, petrol, gasoline, crude oil, motor oil and other hydrogen and carbon-based fuels are used extensively. These global uses include powering factories, homes, automobiles, other vehicles, and equipment or machinery.

Given this ubiquity, there is a risk that oil may be spilled, mishandled, or otherwise inadvertently released into the environment so as to pollute or create a contamination hazard. Oftentimes, these releases result in the unwanted disposal of oil within an aqueous environment such as water, groundwater, rivets, lakes, oceans, or the like.

Some known cleaning and removal approaches include using microorganisms or biological agents to breakdown or remove oil, absorbents, controlled burning, the use of dispersants and dredging, skimming, and vacuum and centrifuge techniques. These known methods, however, are difficult, expensive, and inefficient. This is particularly the case because oil can spread outwardly upon contacting water making it difficult to control and transport.

With respect to chemical dispersants, chemicals are mixed into the environment to attempt to facilitate clean up. Introducing chemicals, however, has shown to have significant negative impacts on marine life and aqueous environment.

Different types of absorbents can be used to absorb oil. Certain natural inorganic absorbents such as sand, clay and volcanic ash can absorb several times their weight in, oil. These types of absorbents, however, are less likely to be hydrophobic and will absorb water as well as oil.

Synthetic absorbents are man-made products developed to absorb a high quantity of oil. These synthetic absorbents, such as polyethylene, nylon and other plastics, will generally float and are better suited for use in water environments. However, synthetic absorbents cannot be cleaned after use and cause further environmental pollution if they are not completely removed and disposed of properly.

Naturally hydrophobic organic absorbents can also be used to clean oil. These absorbents include materials such as dry coconut shell fibers, peat moss, hay, sawdust, ground corncobs, feathers and other readily available carbon-based products. While these naturally hydrophobic absorbents can be used to clean oil, on the surface of the water, widespread use of such materials results in a saturated waste product left behind. These waste products must typically be managed by hand or with other mechanical methods but cannot he easily retrieved from the water.

In a traditional boom and skimmer system the contaminated area can be isolated by the boom and a mechanical skimmer used to only remove oil located at the surface of the water. This process is time consuming and inefficient. In addition, skimming is susceptible to waves, currents, debris, seaweed, kelp, and other water elements which can reduce skimmer efficiency.

Another known approach is the use of an electromagnetic boom and a magnetic field to collect spilled oil as disclosed in U.S. Pat. Nos. 8,795,519 and 9,249,549 and in U.S. application Ser. No. 14/947,201 which are hereby incorporated by reference. These disclosures, however, fail to describe a magnetization method for controlling and moving oil at a micron level through seeding the oil with magnetizable particles or a pulsed-wave electromagnetic system.

Still another approach requires the use of particles sized on the nanometer scale (particles sized on the scale of $1 \times 10^{-9}$ meters) for interacting with oil. Nano-particles, however, bond with the oil through atomic forces (e.g. ferrofluids), which makes the separation of the nano-particles from the oil difficult due to the nature of the bond and because the electrochemistry is different from particles, sized on the micron scale (particles sized on the scale of $1 \times 10^{-6}$ meters). Because nano-particles are primarily held in an oil distribution matrix by atomic forces, the separation of the nano-particles from the oil requires more drag force than with micron sized particles. This increases difficulty of separating the particles and eliminating the safety, and health hazards associated with nanoparticle operations (inhalation etc.) make the process difficult.

Accordingly, a system and method are needed for using magnetization for controlling separating and transporting oil.

BRIEF SUMMARY OF THE INVENTION

The present invention relates to the use of magnetizable particles for controlling and moving oil in response to a magnetic field. In particular, the invention includes introducing magnetizable particles for seeding the oil at the micron scale. This can reduce the rate of oil diffusion that occurs in water and allows the oil to be magnetically manipulated, removing it from water, lifting it from water and nonporous surfaces, as well as separating the magnetizable particles from the oil.

Magnetizable particles such as magnetite, iron oxides, iron filings, ferrite dust filings, or any other similar type of particle can be introduced into a system to help oil spill removal, collection, or cleanup efforts. This invention includes a seeding process that preferentially targets oil by seeding oil with micron-sized magnetizable particles. The particle's preference for the oil and electromagnetic interactions prevents settling. When seeded in oil, the particles can form a unique and preferential bond with the oil resulting in creation of a colloidal mixture. This bond is a result of a combination of forces including Van der Waal forces. The Van der Waals force is a term used to define the attraction of intermolecular forces between molecules, particularly on the micron scale. The particles preferentially bond with the oil when on water while bypassing any water that is not exposed to oil. Once the bond is formed, the oil can be rendered magnetic and can be controlled and moved in response to a magnetic field.

This seeding process also provides a method of probing for oil in water even in situations where the oil is not visible to the naked eye. In one embodiment, the particles can be introduced into a system containing water that may also contain oil. If the particles contact oil, a bond will form between the particles and the oil resulting in creation of the colloidal mixture comprised of both the particles and the oil. This creation of the colloidal mixture can be used to identify the presence and location of the oil.

Oil on water will typically diffuse outward under its own viscous forces until it reaches an equilibrium. This diffusion rate can be reduced, however, through the seeding process. Each particle essentially acts as a small, dipole which interacts with the internal molecular network of forces and with each other, balancing or reducing diffusion forces. Once seeded, in the absence of external forces, the parcel of oil is confined and can be controlled by magnetic forces. By seeding the oil with the magnetizable particles, the diffusion rate of the oil can be reduced or inhibited depending on, the amount of particles dispersed.

The present invention also relates to the use of a magnetic field to control and move the oil. Once the particles have bonded with the oil to form colloidal mixture, magnetic fields can be used to control the oil in different ways. When the particles are dispersed in oil on water or on any nonporous surface, they are for the most part randomly distributed. In the presence of an applied magnetic field, the particles will generally align themselves with the direction of the magnetic field since each particle is behaves like a small dipole magnet in the presence of an external magnetic field. In addition to aligning with the external field, the particles also attract one another. This directional alignment adds rigidity to the colloidal mixture which enhances its viscosity effects orthogonal to the direction of the induced field. This induced viscosity effectively produces a rigidity (i.e. an increase viscosity orthogonal to the magnetics field direction) that allows greater control over the colloidal mixture, e.g. allowing the colloidal mixture to he lifted from the water surface or from other surfaces.

Due to the nature of the size of the particles and the nature of the bond with the oil, magnetic forces also work at moving the colloidal mixture on water. The force on the colloidal mixture of oil and particles is proportional to the gradient of the magnetic field. Due to the low coefficient of friction on the water, the colloidal mixture moves smoothly towards the magnet in the absence of any other external forces, and the water becomes the medium for transporting the oil.

A magnetic field can also be used to separate the bonded particles from the oil. At the interface of the water with another surface, such as some type of barrier, the friction and surface tension forces differ enough so that the particles can be magnetically extracted as they pile up at the boundary interface. A magnet can be used to lift the particles from the water against this interface. The magnetic particles are strongly attracted to the magnet and separate as the magnetic force moves them vertically upward against the barrier.

The present invention also relates to using a magnetic field to control an organic absorbent mixture. In particular, hydrophobic absorbents can mix and bond with magnetizable particles to form a magnetizable absorbent mixture. The bonding between the absorbent, magnetizable particles, and oil can result from several forces including electrostatic forces, adhesion due to the non-polar nature of the absorbents, absorption, Van der Waals forces, and magnetic attraction due to the dipole nature of small magnetic domains associated with the magnetizable particle, particularly in the presence of an external magnetic field.

By introducing an external magnetic force, the absorbent mixture can be controlled in many ways including lifting, raising or otherwise moving the absorbent mixture to a desired location.

Consistent with the teachings of the present invention, a pulsed-wave electromagnetic system may be used in conjunction with the methods described herein. In this embodiment, a pulsed-wave can be used to create a magnetic gradient for controlling and transporting an oil spill in a desired location and for extraction and removal from the system. In the presence of external forces such as those due to wave motion, the system can be aligned in the wave direction. This increases the efficiency by contributing constructively in the direction of the magnet forces.

BRIEF DESCRIPTION OF THE DRAWINGS

FIG. 6A is a side view of a system having magnetizable particles disposed at oil according to one embodiment of the present invention;

FIG. 6B is a side view of a magnetic field being applied to magnetizable particles disposed at oil according to one embodiment of the present invention;

FIG. 8 is a side view of a system having magnetizable particles disposed at oil and an interaction with a magnetic field according to one embodiment of the present invention;

FIG. 9 illustrates an electromagnetic pulsed-wave system having a plurality of magnetic solenoids according to one embodiment of the present invention;

FIG. 15A is a side view of a system having magnetizable particles and absorbents disposed at oil according to one embodiment of the present invention;

FIG. 15B is a side view of a magnetic field applied to magnetizable particles and absorbents disposed at oil according to one embodiment of the present invention;

FIG. 18 illustrates a system for magnetically removing an absorbent mixture according to one embodiment of the present invention.

DETAILED DESCRIPTION OF THE DRAWINGS

Figure 1A:
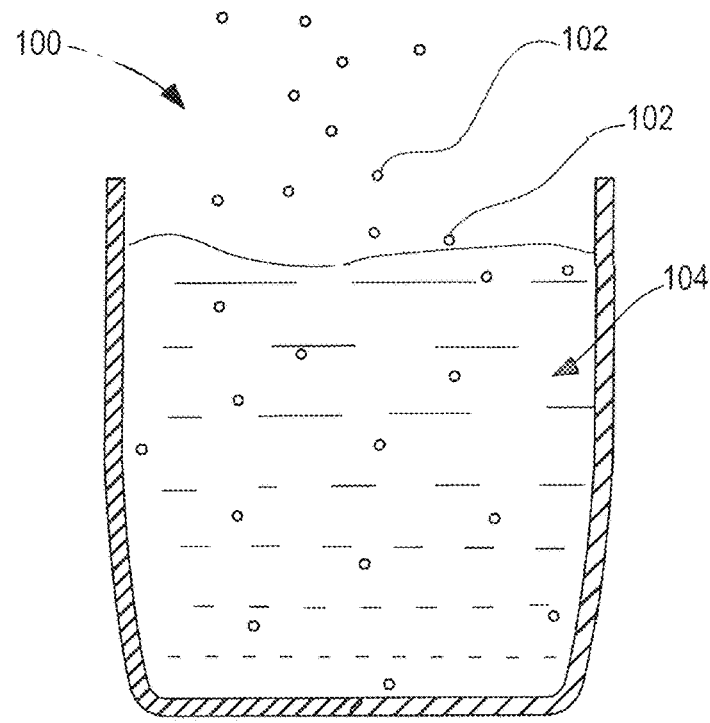
FIG. 1A a side view of magnetizable particles introduced into water according to one embodiment of the present invention.

The detailed description set forth below in connection with the appended drawings is intended as a description of the presently preferred embodiments of the mention and is not intended to represent the only forms in which the present invention may be constructed or utilized. The description sets forth the system, methods, and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

This detailed description relates to an invention for seeding magnetizable particles with oil. Once seeded, the oil becomes susceptible to a magnetic field that can be used for controlling or moving oil. Various applications can include the identifying, separating, lifting, raising, or otherwise transporting of the oil.

The invention and processes described herein are generally controlled by the Van der Waals force in the aqueous phase. As known in the art, the Van der Waals force is a term used to define the attraction of intermolecular forces between molecules, and it is particularly relevant in molecules sized on the micro-scale ($1 \times 10^6$ meters). The Van der Waals force can provide short-range, electrostatic attractive forces between molecules that arise from the interaction of permanent or transient electric dipole moments.

When dispersed in oil, magnetizable particles can form a unique and preferential bond with the oil. This bond is formed as result of a combination of forces including the intermolecular Van der Waal forces associated with the magnetizable particles and oil. If the oil is dispersed is water, the surface tension of the Water may also assist in forming the bond. As a result of this bond, a colloidal mixture is created that includes the particles and oil. Once the bond is formed, oil can be controlled and moved in response to a magnetic field. As used herein, a colloidal mixture may be any type of mixture or combination formed as a result of the interaction of the Van der Wall forces between the magnetizable particles and oil.

Oil can be seeded with magnetizable particles in many different environments. For example, the bonding may occur when oil is spilled or discovered in many different types of aqueous solutions associated groundwater, rivers, lakes, oceans, marshes, swamps. This can be saltwater, or fresh water environments. The seeding process can also be implemented on oil trapped below the surface of the water and on non-porous surfaces.

The magnetizable particles include iron oxides such as $Fe_3O_4$, $Fe_2O_3$, FeO as well as iron filings. However, magnetite ($Fe_3O_4$) is preferred because it is stable, does not oxidize (rust) and is natural to the environment. These magnetizable particles may also generally be sized on the micron scale ($1 \times 10^6$ meters) and preferably in the range of 2 µm-10 µm. In some applications, the amount of magnetizable particles that, are required can vary based on a number of factors including the amount of oil that is present, the environment, the applied magnetic field, or the type of control or movement of the oil that is desired. Consistent with the teachings of this invention, as used herein, oil may be many different types of hydrocarbons including petroleum, petrol, gasoline, crude oil, motor oil and any oil spill, other similar compounds that are capable of bonding with the magnetizable particles. It will be appreciated that this invention may also be used with other types of hydrocarbons, including blood, oil-based colors, dyes, pesticides, herbicides, and automotive fluids.

Figure 1B:
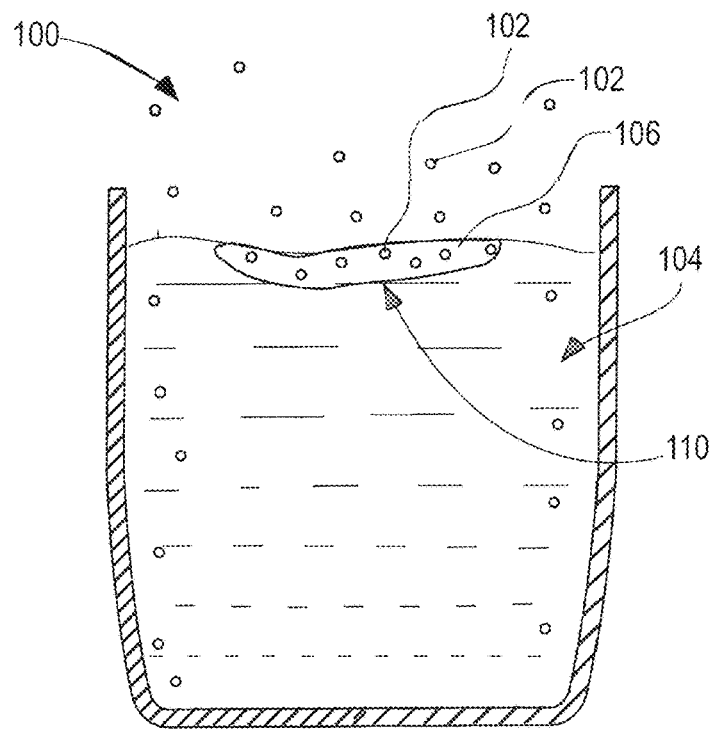
FIG. 1B is side view of magnetizable particles introduced into an oil spill in water according to one embodiment of the present invention

A system 100 is illustrated in FIGS. 1A-1B that includes magnetized particles 102 and oil 106 dispersed in water 104. In this example, the seeding process can help probe for the existence of oil even if it cannot be seen by the naked eye. As shown in FIG. 1B, the magnetizable particles 102 are introduced to system 100. Once introduced, the magnetizable particles 102 will seed with the oil 106 they contact while passing through any water 104 that is not exposed to the oil 106. As a result, a colloidal mixture 110 is formed and can be visually detected.

In contrast, the system 100 in FIG. 1A includes water 104 but no oil. When the magnetizable particles 102 are introduced, they will flow through the water 104 without any seeding and thereby indicate that no oil is present.

Figure 2A:
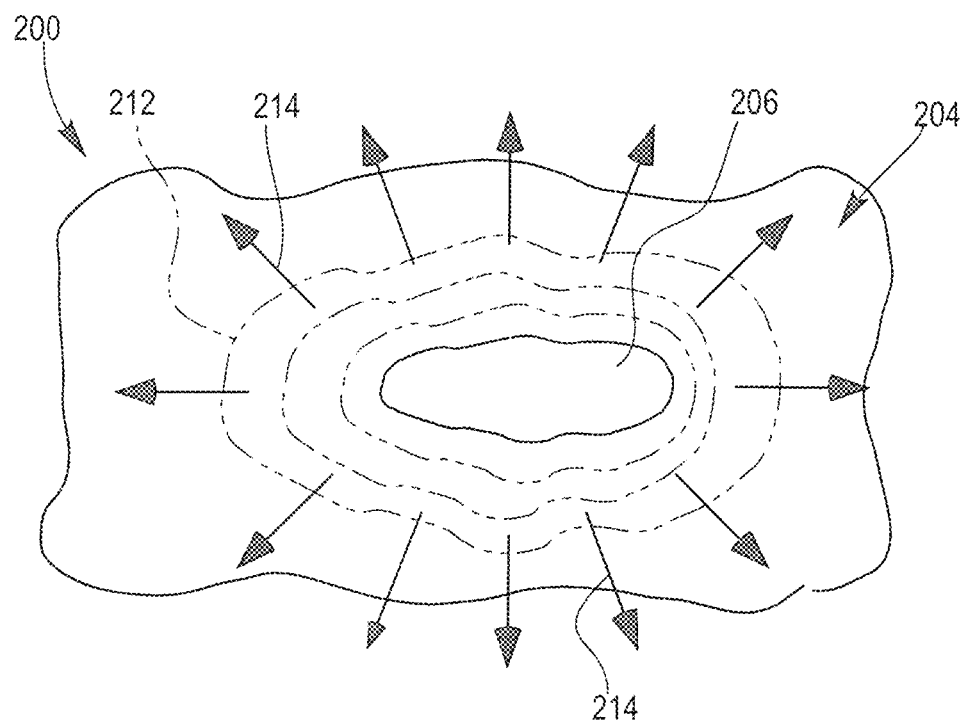
FIG. 2A is a top view of oil diffusion in water according to one embodiment of the present invention.
Figure 2B:
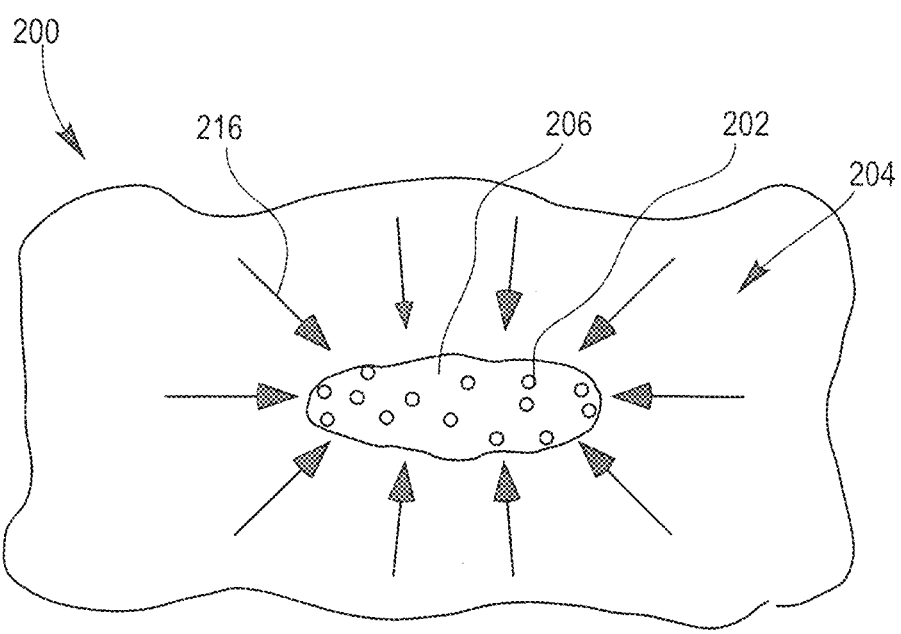
FIG. 2B is a top view of the magnetizable particles interacting with oil according to one embodiment of the present invention.

As shown in FIGS. 2A-2B, when oil 206 is disposed in water 204, it will typically diffuse outward under its own viscous forces until it reaches an equilibrium. As shown in FIG. 2A, an initial plume of oil 206 is disposed in the water 204. Over time, the oil will spread outwardly 212 as a result of diffusion and viscous forces 214. In cases such as an oil spill, this outward spread—if left uncontained—can cause significant pollution and contamination.

By seeding magnetizable particles 202 with the oil 206, however, the diffusion rate of the oil can be reduced. Referring to FIG. 2B, magnetizable particles 202 are introduced into the system 200 to contain the spread or the oil 206. The magnetizable particles 202 bond with the oil 206 and introduce new forces 216 into the system 200. These new forces 216 include the Van der Waals forces associated with the bond between the magnetizable particles 202 and the oil 206 as well as the individual internal forces associated with each of the magnetizable particles 202. The distribution of these forces 216 can oppose the diffusion and viscous forces 214 resulting in a reduction of the rate of oil spread. Eventually, the oil spread will stop once the system forces reach equilibrium.

An additional amount of magnetizable particles 202 may be introduced to the system 200 to add additional force. In one example, the ratio between the amount of magnetizable particles 202 that are introduced into the system 200 relative to the amount of oil 206, could be such that the amount, of the oil 206 does not introduce more diffusion and viscous drive force than the forces exerted as a result of the introduction of the magnetizable particles 202.

Figure 3A:
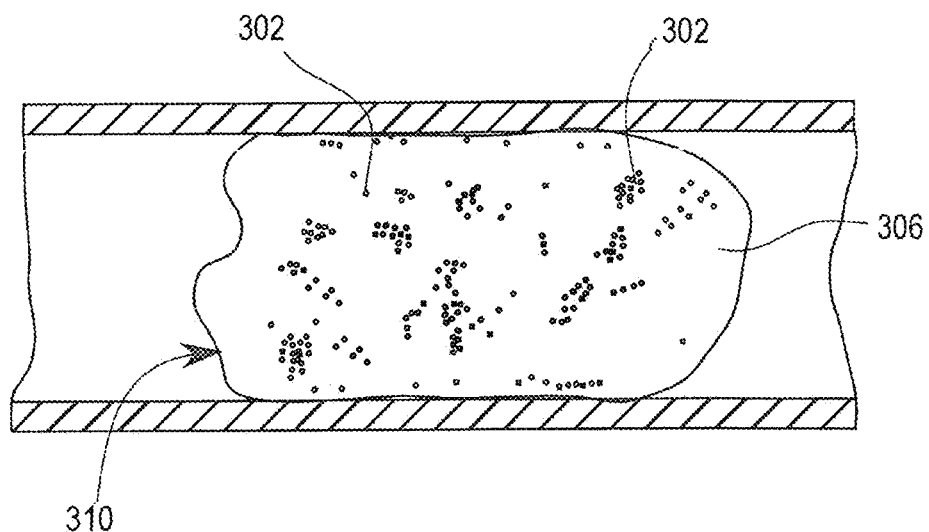
FIG. 3A illustrates magnetizable particles randomly disposed at an oil spill according to one embodiment of the present invention.
Figure 3B:
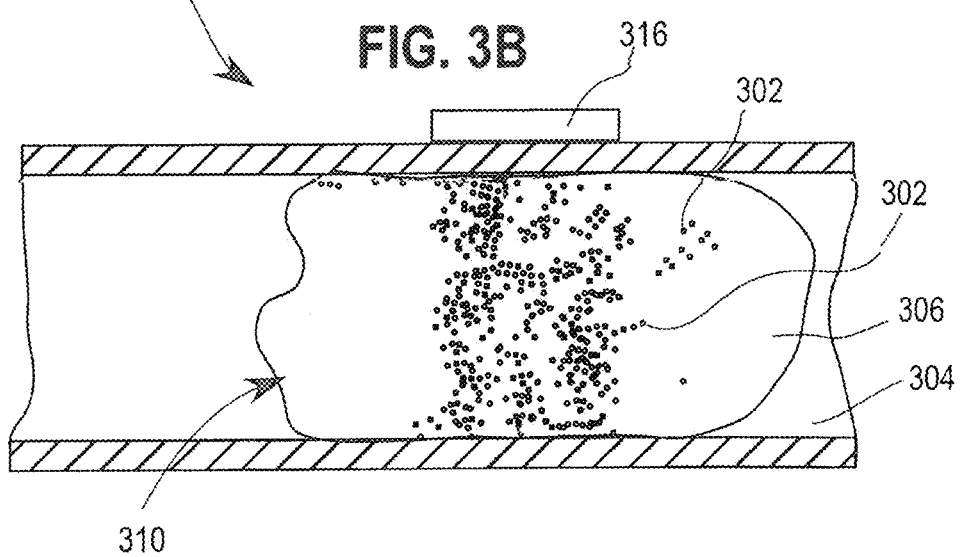
FIG. 3B illustrates magnetizable particles that are disposed in general alignment with a magnetic force at an oil spill according to one embodiment of the present invention.

Once seeded, the particles may be generally dispersed on the oil in a random distribution. A magnetic field can be used to align the magnetizable particles in a rigid configuration as shown in FIGS. 3A and 3B. Referring to FIG. 3A, the magnetizable particles 302 are randomly seeded throughout the oil 306. Generally, this less structured and randomized configuration is weaker and makes it more difficult to control or move the oil 306. As shown in FIG. 3B, however, a magnet 316 applies a magnetic force to the particles 302. Each particle 302 includes an internal dipole magnet. Accordingly, when the magnetic force is applied to the particles 302, they move from the random distribution to an orientation that is generally aligned in the direction of the magnetic field. This results in a stronger configuration that permits increased control over the magnetizable particles 302, oil 306, and the colloidal mixture 310.

A magnetic field can also be used to move the oil in a general direction as illustrated in FIGS. 4A-4D. The system 400 includes magnetizable particles 402 and an oil plume 406 that is dispersed in water 404. A resulting colloidal mixture 410 is formed as a result of the bond formed by the seeding of the magnetizable particles 402 with the oil 406. In this example, a magnet 416 exerts a force creating a magnetic field gradient 414 within the system 400. Accordingly, the strength of the magnetic force as applied to the colloidal mixture 410 changes based on distance from the magnet 416. Generally, the magnetic force applied on the colloidal mixture 410 is proportional to the magnetic field gradient.

In this example, water serves as the medium for transporting the oil. Given the low coefficient of friction on the water, the colloidal mixture 410 can move smoothly towards the magnet 416. Also, due to the nature of the size, of the particles 402 and the nature of the bond with the oil 406 formed by the Van der Waals force, magnetic fields generally work well at moving the colloidal mixture 410 on water.

Figure 4A:
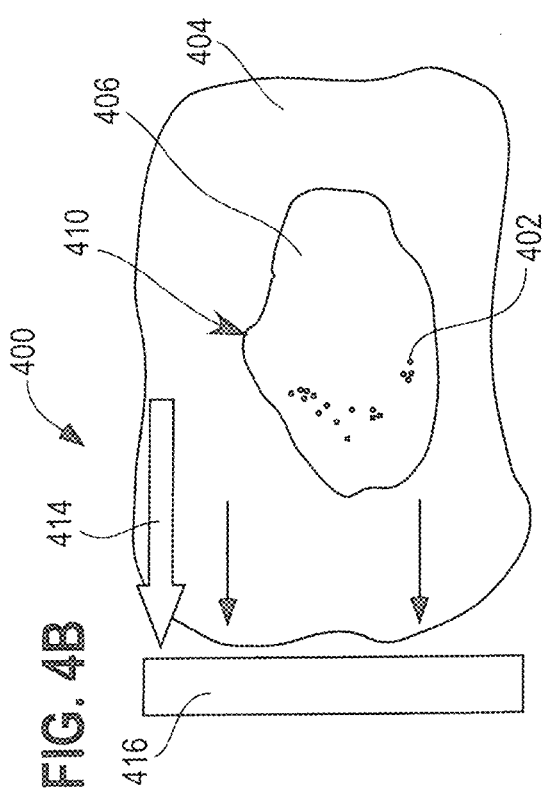
FIG. 4A illustrates a magnetic field being applied to magnetizable particles disposed at oil according to one embodiment of the present invention.
Figure 4B:
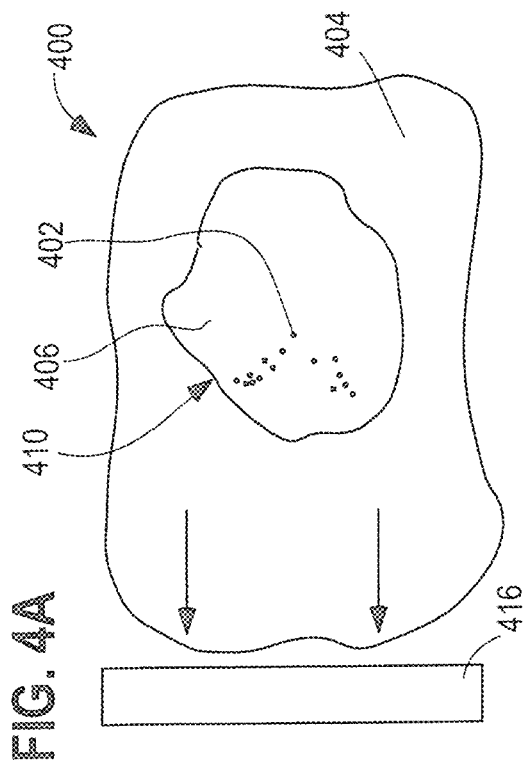
FIG. 4B illustrates a magnetic field being applied to magnetizable particles disposed at oil according to one embodiment of the present invention.
Figure 4C:
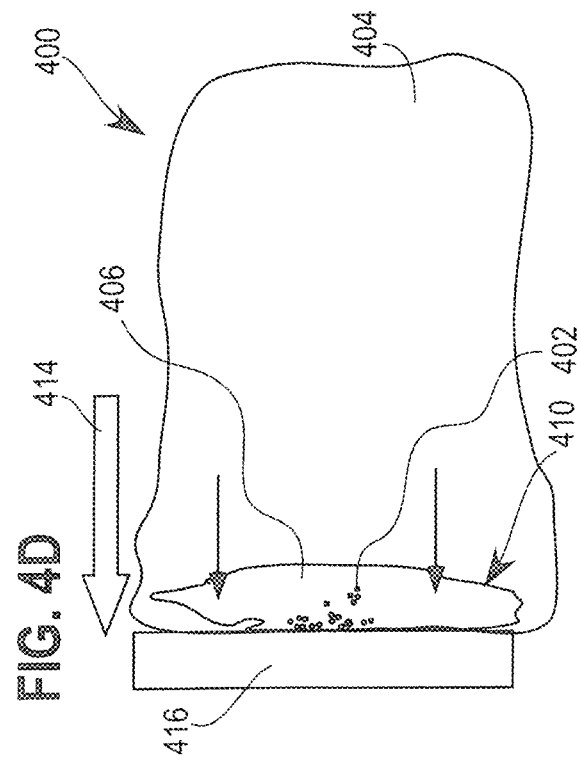
FIG. 4C illustrates a magnetic field being applied to magnetizable particles disposed at oil according to one embodiment of the present invention.
Figure 4D:
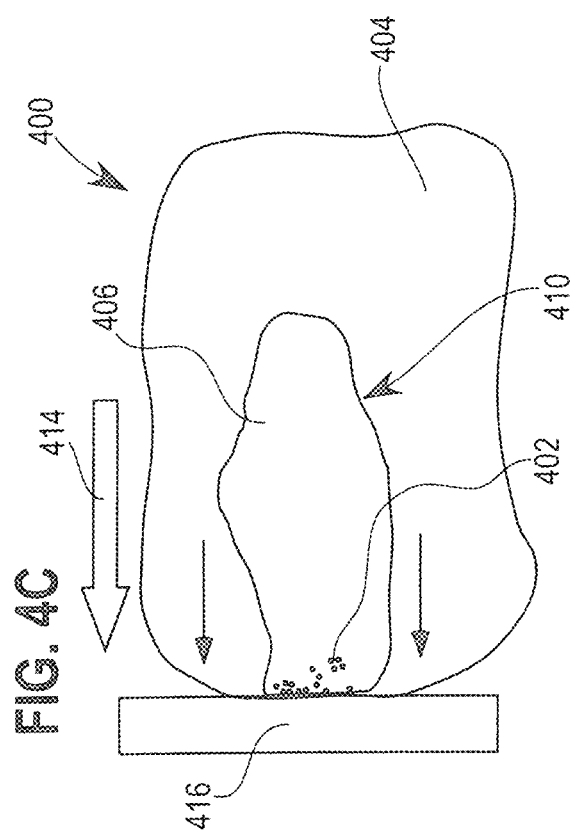
FIG. 4D illustrates a magnetic field being applied to magnetizable particles disposed at oil according to one embodiment of the present invention.

Referring to FIG. 4A, magnetizable particles 402 have bonded with oil 406 to form the colloidal mixture 410 in water 404. In FIG. 4B, a low magnetic force begins to attract the colloidal mixture 410 in the direction of the magnet 416. As shown in FIG. 4C, the colloidal mixture 410 continues to move toward the magnet 416 as the magnetic force becomes stronger.

Still referring to FIG. 4C, the stronger magnetic force causes the bonded magnetizable particles 402 to move relative and toward the distal end of the oil plume 406. While the magnetizable particles 402 are not uniformly distributed about the oil plume 406, the bond continues to exist between the magnetizable particles 402 and the oil 406. In addition, the internal and strong elemental bonds between the individual oil molecules are not broken. Accordingly, and referring to FIG. 4D, the magnetic particles 402 and the oil plume 406 are transported to the desired location.

Figure 5A:
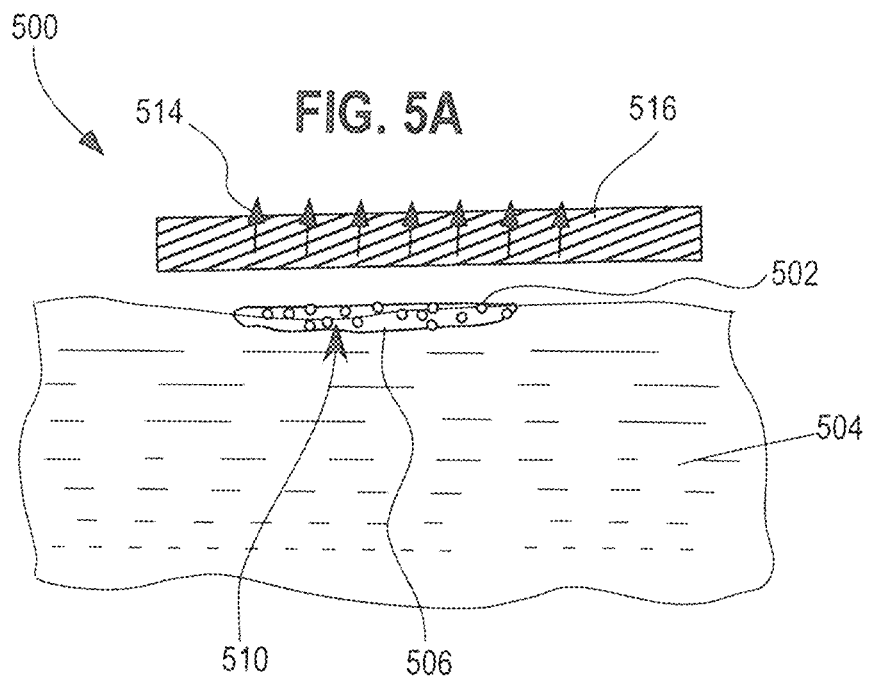
FIG. 5A is a side view of a system having magnetizable particles disposed at oil according to one embodiment of the present invention.
Figure 5B:
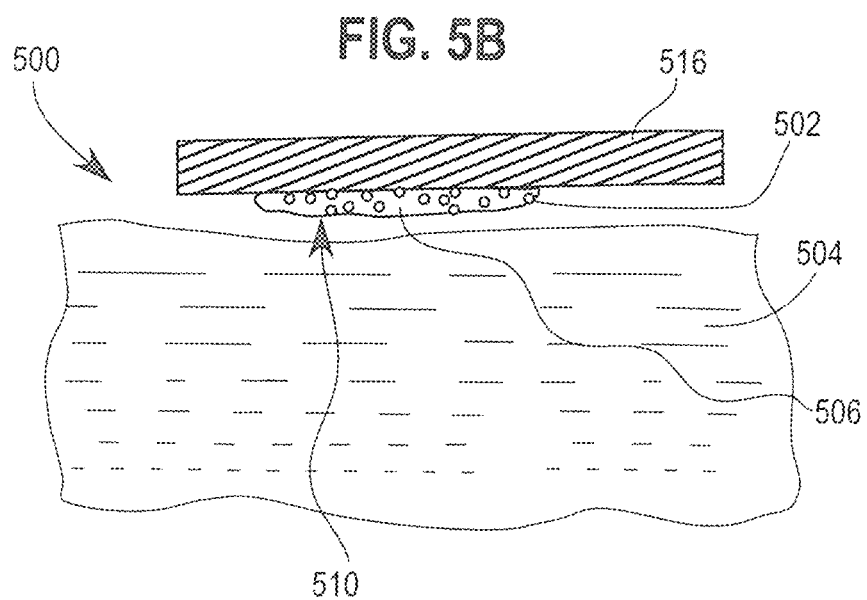
FIG. 5B is a side view of a magnetic field being applied to magnetizable particles disposed at oil according to one embodiment of the present invention.
Figure 7A:
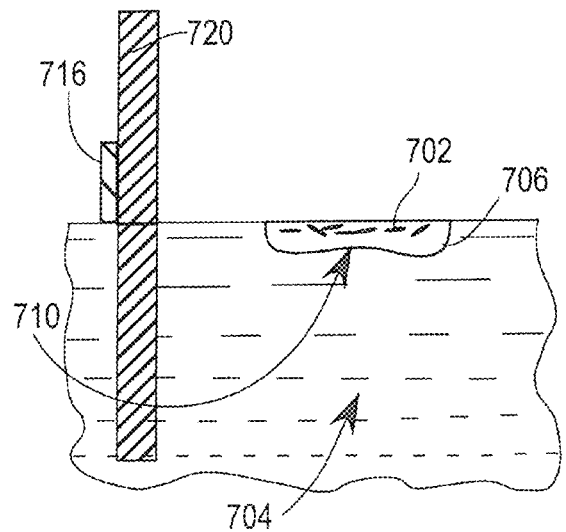
FIG. 7A illustrates a magnetic field being applied to magnetizable particles disposed at oil according to one embodiment of the present invention.
Figure 7B:
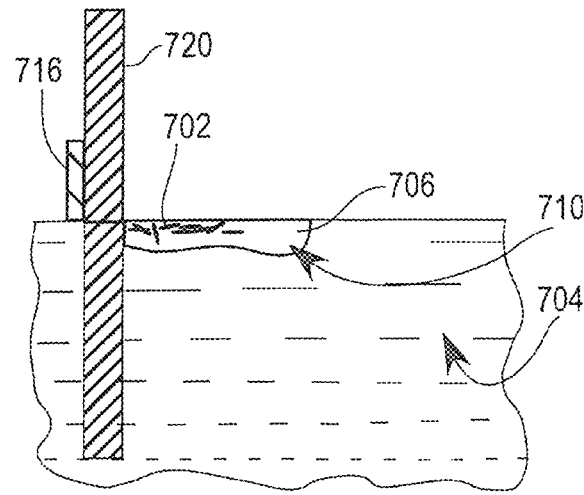
FIG. 7B illustrates a magnetic field being applied to magnetizable particles disposed at oil according to one embodiment of the present invention.
Figure 7C:
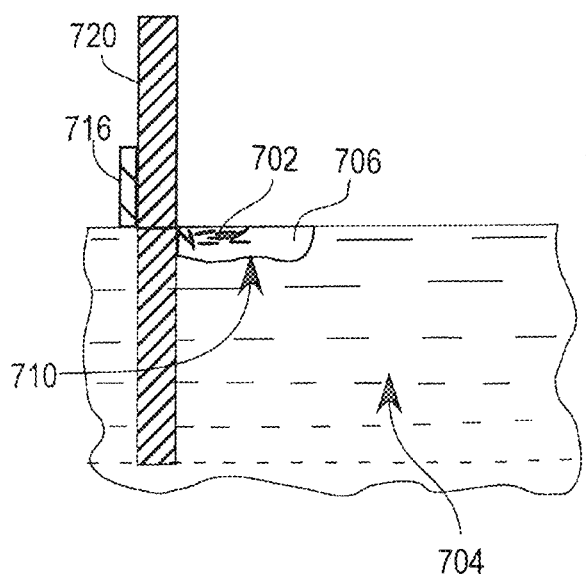
FIG. 7C illustrates a magnetic field being applied to magnetizable particles disposed at oil according to one embodiment of the present invention.
Figure 7D:
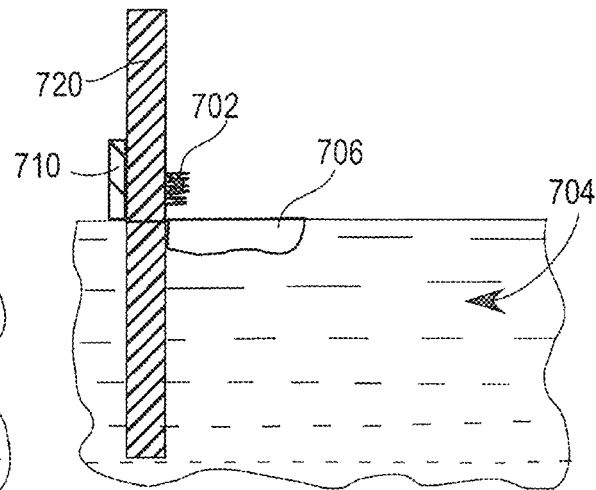
FIG. 7D illustrates a magnetic field being applied to magnetizable particles disposed at oil according to one embodiment of the present invention.

A magnetic field can be, used to lift oil from a surface as shown in FIGS. 5A-5B. 6A-6B, and 8. Referring to FIGS. 5A-5B, a system 500 includes magnetizable particles 502 that are bonded with oil 506. The resulting colloidal mixture 510 is disposed on water 504. In this example, a magnet 516 exerts a magnetic force 514 that lifts the colloidal mixture 510 away from the water 504 and toward the magnet 516. In water, both the magnetic force 514 and water surface tension force facilitates the lifting of the colloidal mixture 510. The amount of magnetizable particles 502 needed for the lifting application depends on many factors such as the amount of oil, the strength of the magnetic force, and other environmental conditions. In one example, this amount should be enough to provide an attractive force with respect to the magnetic field, and coupled with the water surface tension force, that is greater than the other opposing forces. Application of this embodiment of the invention can occur in many different ways including for the removal of oil from contaminated groundwater, lakes, oceans, rivers and the like. Similarly, this embodiment can also apply to other landscapes such as marshes, swamps, and bogs.

FIG. 8 illustrates a system 800 for removing a colloidal mixture 810 from water 804. A magnet 816 creates a magnetic field 814 for attracting the colloidal mixture 810. In this example, the magnet 816 is disposed at the water 804 in an inclined configuration. Accordingly, the magnetic field 814 can be applied to move the colloidal mixture 810 up the inclined configuration for removal from the system 800. As a result of the angle of inclination and the non-absorbent nature of the materials used, the system does not collect water and is more efficient at collecting oil than existing methods.

Referring to FIGS. 6A and 6B, a system 600 is shown that includes a nonporous surface 618. System 600 includes a magnet 616 that exerts a magnetic force 614 for raising a colloidal mixture 610 from a nonporous surface 618. A nonporous surface 618 may include any fields, grass, dirt, concrete or other ground surface. With respect to nonporous surfaces, however, additional force may be needed to lift the colloidal mixture 610 as the water surface tension force may not exist. This can be achieved by using a stronger magnetic force or by adding more magnetizable particles 602 to the system 600.

As discussed above, a magnetic field can be used to move magnetic particles from a random distribution to an orientation that is generally aligned in the direction of the magnetic field. This can also facilitate the lifting of the colloidal mixtures 510, 610 that is described in FIGS. 5A-5B and 6A-6B. This directional alignment of the magnetic particles 502, 602 adds rigidity to the colloidal mixture 510, 610 which enhances its viscosity effects orthogonal to the direction of the induced field. This induced viscosity effectively produces the rigidity that helps the colloidal mixture 510, 610 to be lifted from water or from other surfaces.

It may also be useful to separate the particles from the colloidal mixture once the oil has been moved to a safe and desired location. The removed particles can then be recycled and reused. As illustrated in FIGS. 7A-7D, a magnet 716 is used to separate the bonded magnetizable particles 702 from the oil 706. An interface exists between the water and a separation barrier 720. In this instance, the separation barrier 720 is a vertical column disposed between the, magnet 716 and the colloidal mixture 710, but it can be any type of object that provides the friction capable of separating the magnetizable particles from oil. At this interface, the friction and surface tension forces differ enough to extract the particles 702 as they pile up at the boundary interface between the magnet 716 and the water 704. The particles 702 are strongly attracted to the magnet 716 and can be separated from the oil 706 as the magnetic field moves them vertically upward against the separation barrier 720. This principle may also be used to separate the particles from oil in the absence of water.

Figure 10:
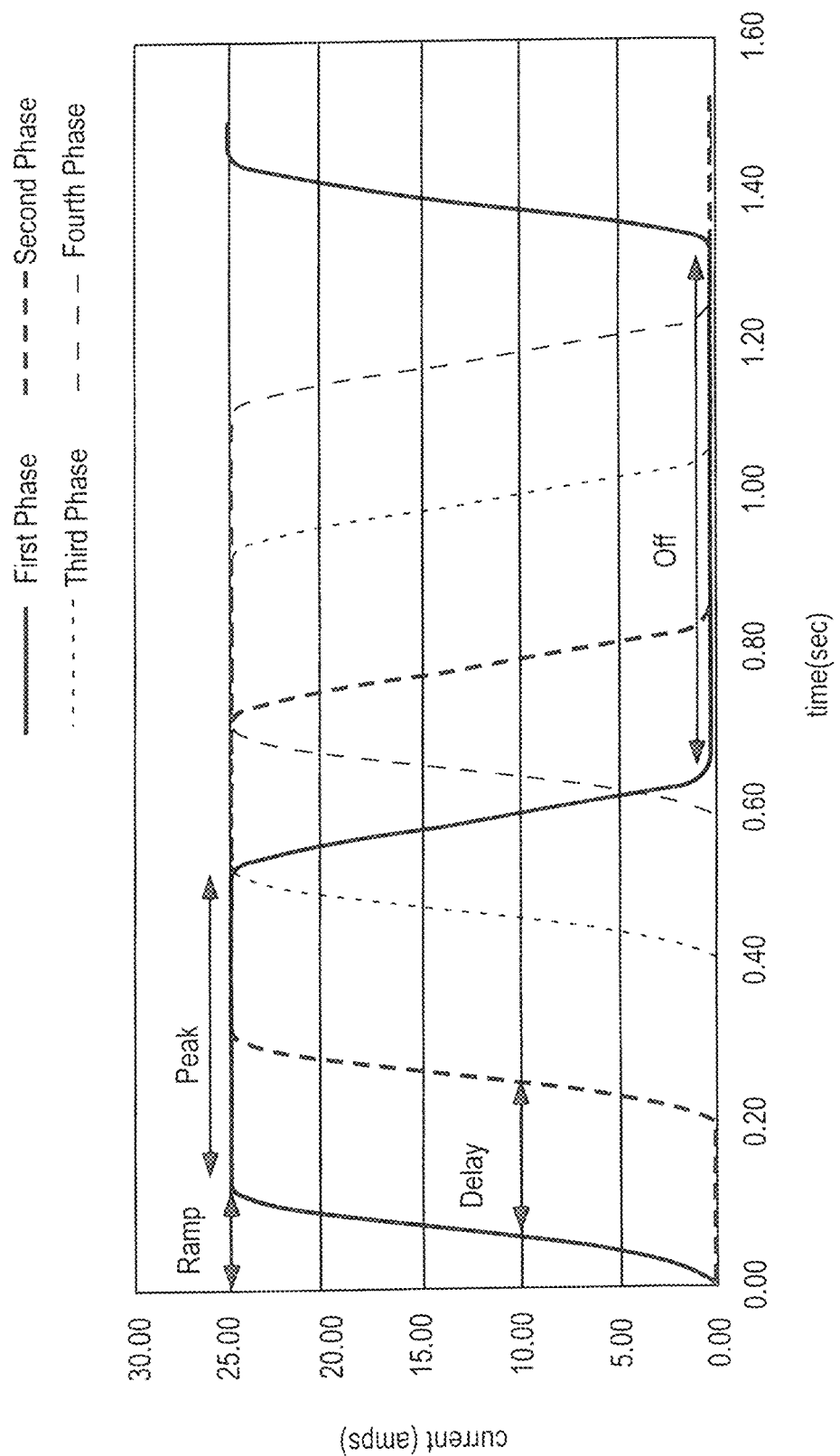
FIG. 10 is a graphical view of a waveform sequence associated with one embodiment of the present invention.
Figure 11:
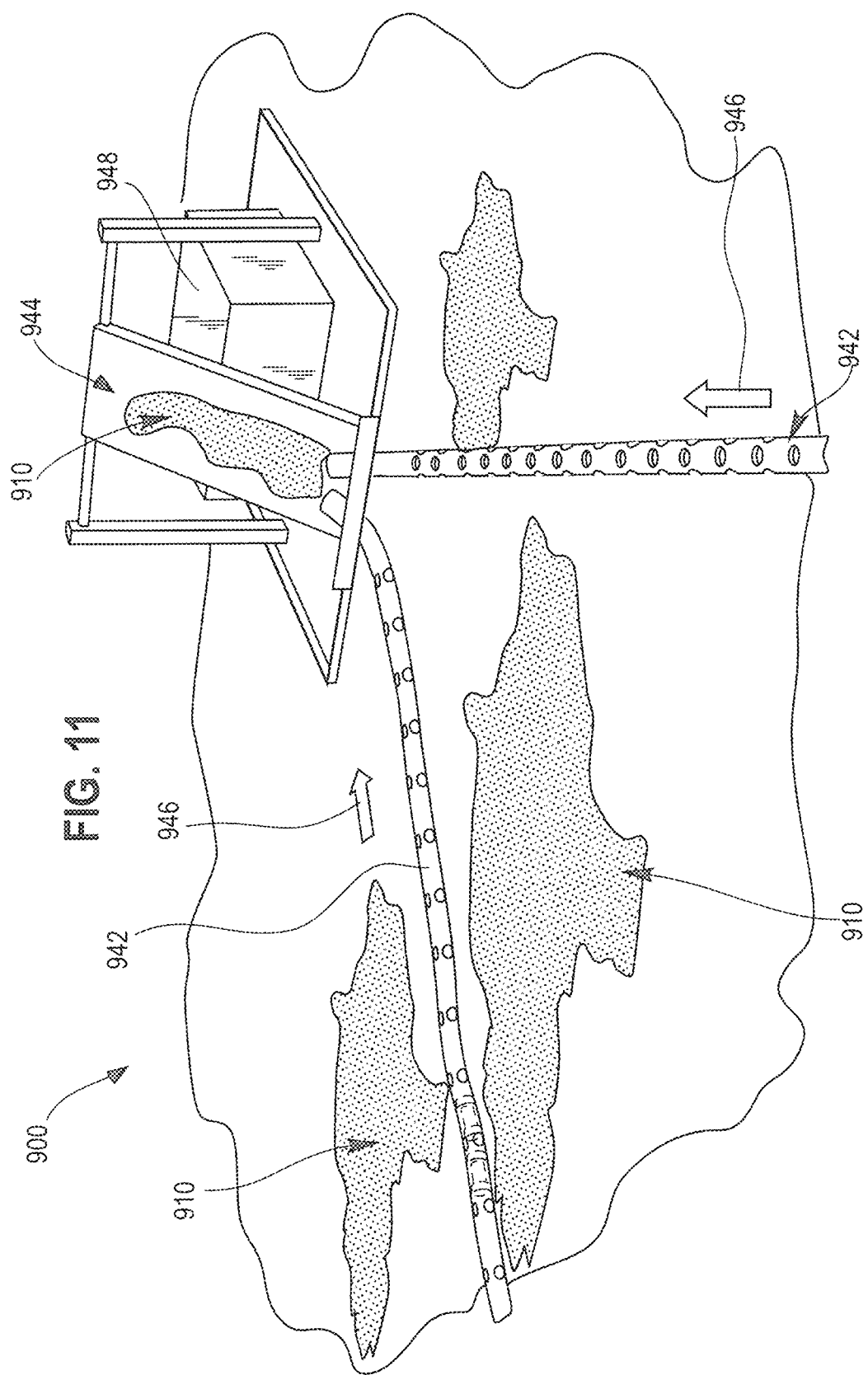
FIG. 11 is a perspective view of a system for using an electromagnetic pulsed-wave system for transportation of oil according to one, embodiment of the present invention.

An electromagnetic pulsed-wave system 900 is illustrated in FIGS. 9-11. This system 900 provides a pulsed-wave for moving oil that has been dispersed in water to a desired location. The system 900 can also be regulated either by voltage or current control as desired. As described above, the magnetizable particles are introduced into the system 900 to bond with oil and form a colloidal mixture 910. The system 900 includes a group of electrically coupled solenoid magnets that are configured to generate a time-varying magnetic gradient puke that travels axially in the flow direction 924. In this example, solenoid magnets 927, 929, 931, 933, 935, 937, 939, 941, and 943 are described, but any number of solenoid magnetics may be used.

In this example, each of the solenoid magnets are linearly connected and exert a magnetic field that is capable of attracting the colloidal mixture 910 and then moving it along s desired path in the flow direction 924. In particular, the magnetic field produced from each solenoid can attract the colloidal mixture as represented by attraction flow paths 926. Each solenoid is also capable of transporting the colloidal mixture alone direction of the magnetic force.

In this example, each solenoid is separated by approximately 0.79 times the radius "R" of the solenoid coils. This spatial configuration provides gradient coupling between the coils because it is less than the known "Helmholtz spacing" for coils. In operation, a magnetic gradient also exists between each of the solenoids as the associated magnetic field varies as it moves further away from the solenoid.

The parameters for the electromagnetic pulsed-wave system 900 are based on a stepped multiphase concept. The number of phases for the system 900 can be based on parameters such as power consumption, flow efficiency, magnetic field strength, timing and the spacing of the associated magnets or solenoids. This can also include the geometric factors associated with the magnets themselves. Ideally, the parameters identified above would he optimized so as to accommodate the magneto-fluid dynamics associate with oil flow on water.

An electromagnetic pulsed-wave can be generated by many different wave sequences. In this example, a 4-phase sequence is used to generate the electromagnetic pulsed-wave and magnetic gradient in the desired flow direction 924.

Referring to FIG. 9, first phase solenoids 927 and 935 are paired to generate electromagnetic pulses 928 and 945 at the same time. Similarly, second phase solenoids 929 and 937 are paired to generate an electromagnetic pulse 930, 936 at a later time offset from that of the first phase solenoids 927, 935. Third phase solenoids 931 and 939 generate an electromagnetic pulse 932, 938 at a time offset from the second phase solenoids 931, 939. And fourth phase solenoids 933 and 941 generate an electromagnetic pulse 934, 940 at a time offset from the third phase solenoids 931, 939. This configuration results in the propagation of an electromagnetic pulsed-wave capable of moving the colloidal mixture in the flow direction 924.

Referring to FIG. 10, an electromagnetic pulsed-wave can be generated by powering the solenoid magnets on and off in cycles so as to produce a chain of magnetic dipole fields that move from one, end of a string of solenoid magnets to the other. FIG. 10 illustrates a schematic plot of current versus time for different time intervals for phases associated with the first 927, 935, second 929, 936, third 931, 939, and fourth 933, 939 solenoid magnets as identified in FIG. 9.

These operational states can be governed by the following 4 variables:
1) $T_{ramp}$—the time it takes for magnet to turn on or off
2) $T_{peak}$—the time when the solenoid is at its peak
3) $T_{off}$—the time between pulses
4) $T_{delay}$—the time between the start of a magnet's power cycle and the start of the next magnet's power cycle Accordingly, $T_{on}$ is determined as $T_{on}=T_{ramp}+T_{peak}+T_{ramp}$.

$T_{period}$ is determined as $T_{period}T_{on}+T_{off}$.

In order to produce a chain of magnetic dipole fields that move from one end of a string of magnets to the other, $T_{delay}$ should divide evenly into $T_{period}$. The optimum separation between the dipole fields occurs when $T_{on}=T_{off}$.

In other examples, the electromagnetic pulsed-wave can have different sequencing through controlling the times and patterns in which the various solenoids are sequenced or powered in "on" or "off" states. In particular, the flow rate of the colloidal mixture 910 can be controlled through the different sequencing patterns of the solenoids as desired. Similarly, the solenoids can be powered to a current or voltage magnitude equal to either a full value amount or any partial value amount of the particular solenoid to generate a desired sequencing pattern.

Accordingly, the pattern sequencing and magnitude variance of the solenoids permits the electromagnetic pulsed-wave system 900 to move the colloidal mixture 910 in various directions including in the forward, reverse, any peripheral direction, or it can be used to maintain the colloidal mixture 910 in a stationary position.

Referring to FIG. 11, the pulse-wave system 900 includes an electromagnetic boom system 942 and a depository 944. The electromagnetic boom system 942 includes the plurality of solenoid magnets, as described above, that are capable of providing an electromagnetic pulsed wave. Each of solenoids provides a magnetic force for attracting and transporting the colloidal mixture 910 in a flow direction 946. The rate at which the colloidal mixture 910 moves in the flow direction 946 is proportional to the magnetic field gradient and viscosity of the spilled oil.

Figure 12:
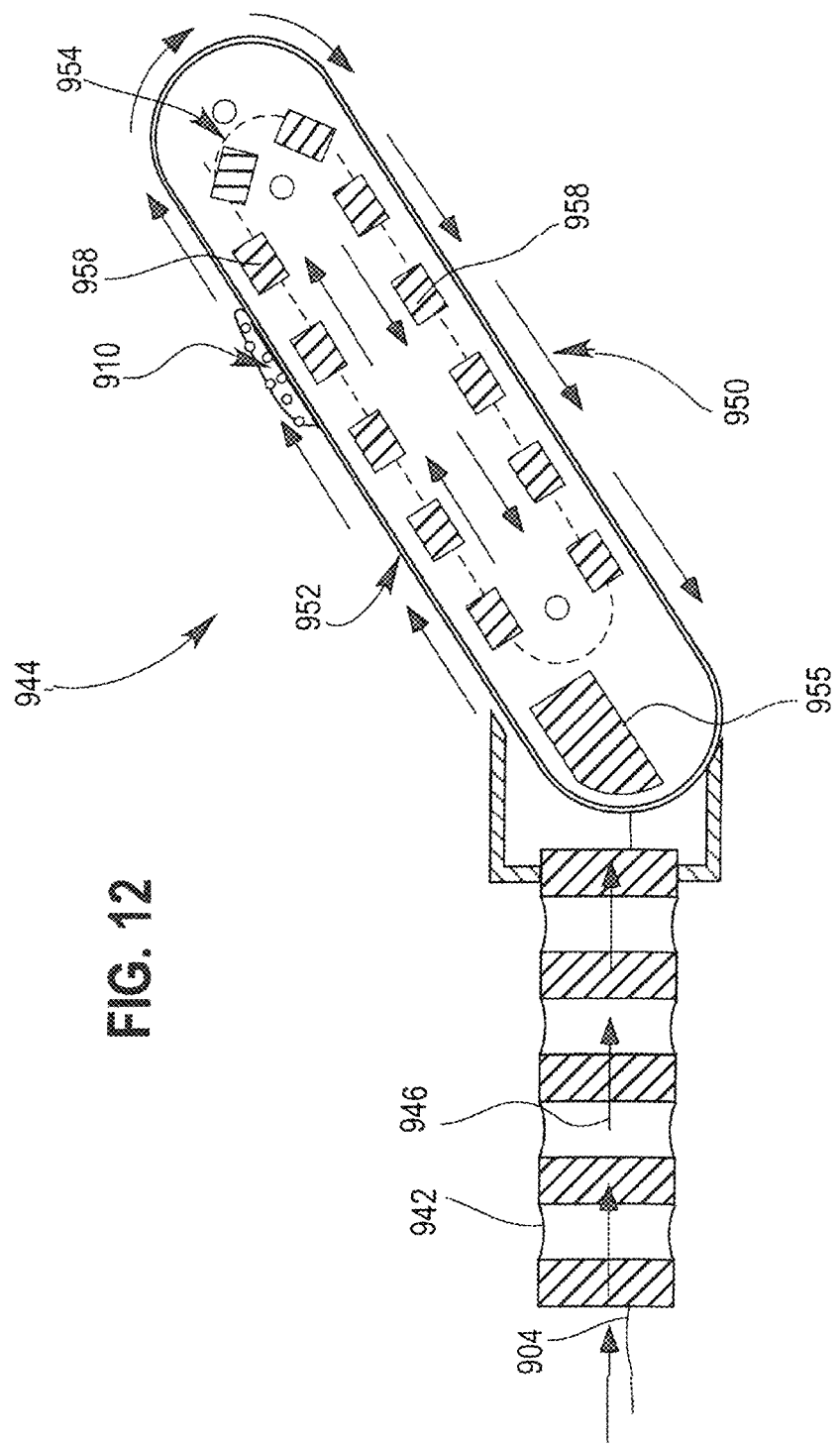
FIG. 12 illustrates a system for magnetically removing oil according to one embodiment of the present invention.
Figure 13:
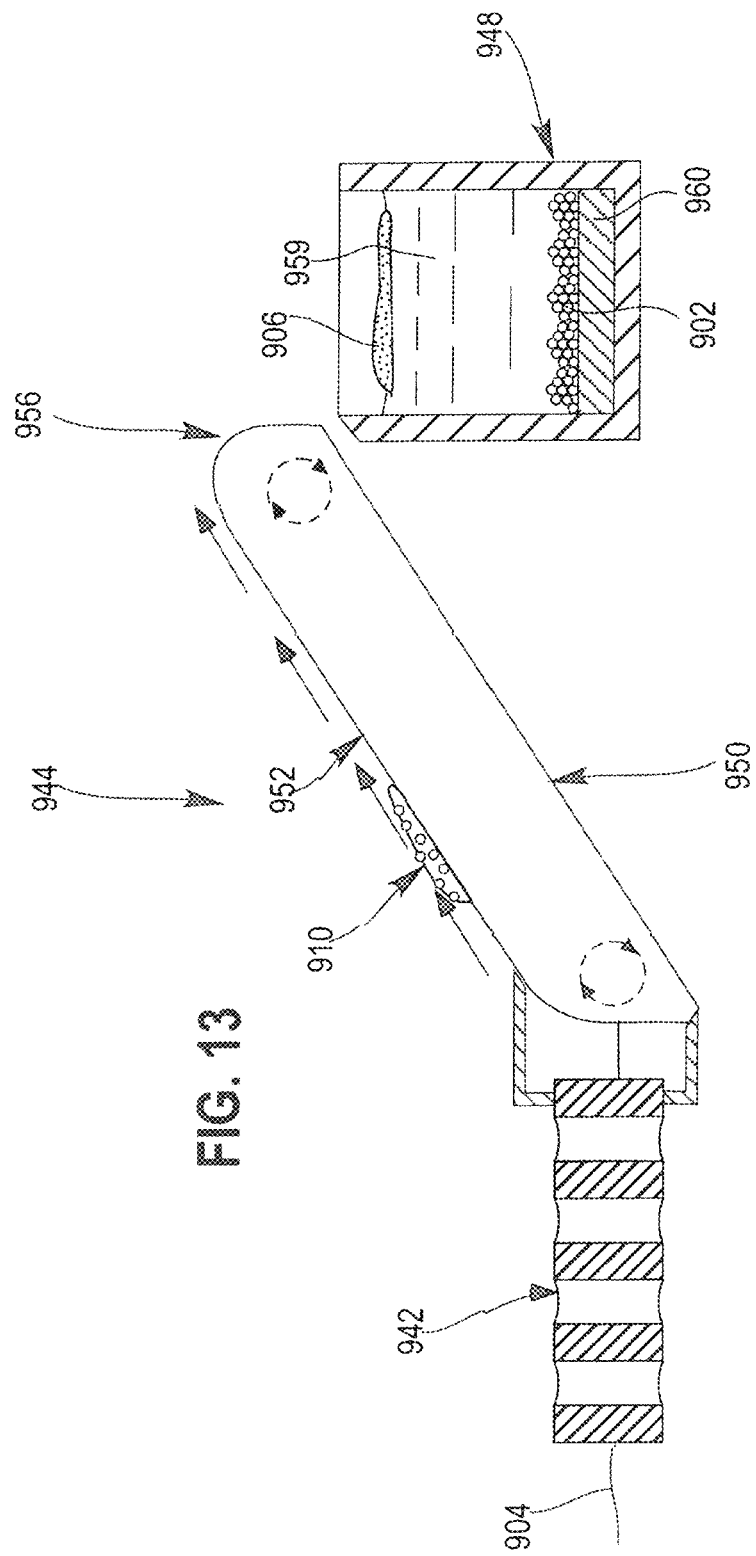
FIG. 13 illustrates a system for magnetically removing oil according to one embodiment of the present invention.

The colloidal mixture 910 can move along the electromagnetic boom 942 until it reaches the depository 944 Referring to FIGS. 12-13, a depository 944 includes an electromagnetic skimmer or ramp 950 that is used to remove the colloidal mixture 910 from water 904. The electromagnetic skimmer 950 can be generally disposed in an upward and inclined configuration and magnetically coupled to the electromagnetic boom 942 such that the colloidal mixture 910 can be transferred. The skimmer 950 also includes an electric dipole magnet 955 disposed proximate to the interface of the electromagnetic boom 942 and skimmer 950 so as to facilitate transfer of the colloidal mixture 910.

The electromagnetic skimmer 950 also includes a dual belt system including a rotating outer belt 952 and a rotating permanent magnet belt 954. In one example, the rotating outer belt 952 can be made of a polymer such as polyurethane although other materials may be used in the alternative. And the rotating permanent magnet belt 954 may include one or a plurality of permanent magnetic arranged in various configurations so as to provide a magnetic field. Both belts 952 and 954 can rotate continuously about the electromagnetic skimmer 950 and can be configured to move at different relative speeds. The electric dipole magnet 95 assists in magnetically removing the oil 906 from the system 900 to the rotating outer belt 952. In this example, the rotating outer belt 952 is magnetically coupled with the electromagnetic boom 942 so as to receive the oil 906 from the water 904. This permits the rotating outer belt 952 to carry the oil upward toward a separator section 956. The rotating permanent magnet belt 954 includes a plurality of magnets 958 that are located interior to the rotating outer belt 952. These magnets 958 can apply a magnetic force to facilitate control and attraction of the oil disposed on the outer rotating belt 952. Since the speed of the rotating permanent magnet belt 954 can be adjusted, the magnetic force created by the magnets 958 can vary in direction and scope.

In one example, and referring to FIGS. 11-13, the electromagnetic skimmer 950 can be oriented at an inclined angle of approximately 60° with respect to the surface of the water or ground. Accordingly, the angle of inclination, the speeds of the rotating outer belt 952 and the rotating permanent magnet belt 954 can cause the colloidal mixture 910 to be drawn upwardly while excess water is rejected at the interface of the electromagnetic skimmer 950 and slides downwardly along the incline. This results in less water being drawn toward the top of the skimmer 950 as the oil 906 and colloidal mixture 910 can further displace the water and block it from moving up the incline. In other examples, the electromagnetic skimmer 950 can be oriented at a range of angles from 0° to 90° as is desired and applicable and the speeds of the rotating belts 952 and 954 and the magnetic strength of the rotating permanent magnet belt 954 can be adjusted to account for the desired angle orientation.

Through rotation, the dual belt system also creates fluid dynamics that facilitates transfer of the colloidal mixture 910 to the rotating outer belt 952 for manipulation by the magnetic field generated by the rotating permanent magnet belt 954. Accordingly, this configuration facilitates the transferring to the rotating outer belt 952 of colloidal mixture 910 located within a relative proximity to the electromagnetic skimmer 950 including oil 906 located adjacent to the skimmer 950 or below the surface of the water and proximal to the skimmer 950.

The electromagnetic skimmer 950 also forms a separator container 956 where the colloidal mixture can exit to the separation container 948. The separator section 956 is positioned within the electromagnetic skimmer 950 so as to be affected by little to generally no magnetic force. When the carried colloidal mixture 910 reaches the separation section 956, it is able to exit the separation container 948 under the force of gravity. As shown in FIG. 13, the separation container 948 is filled with water 959 and includes a magnet 960 disposed toward its bottom section. Once the colloidal mixture 910 enters the separation container 948, the magnet 960 is configured to provide a strong enough magnetic field to attract the magnetizable particles 902 toward the bottom of the container 948 while the oil 906 remains in the water 959 at a top portion of the container. This separation permits the magnetizable particles 902 to be recycled and reused. In another example, the speeds of the rotating belts 952 and 954 can vary with respect to one another so as to facilitate separation of the oil 906 from the colloidal mixture 910.

Figure 14:
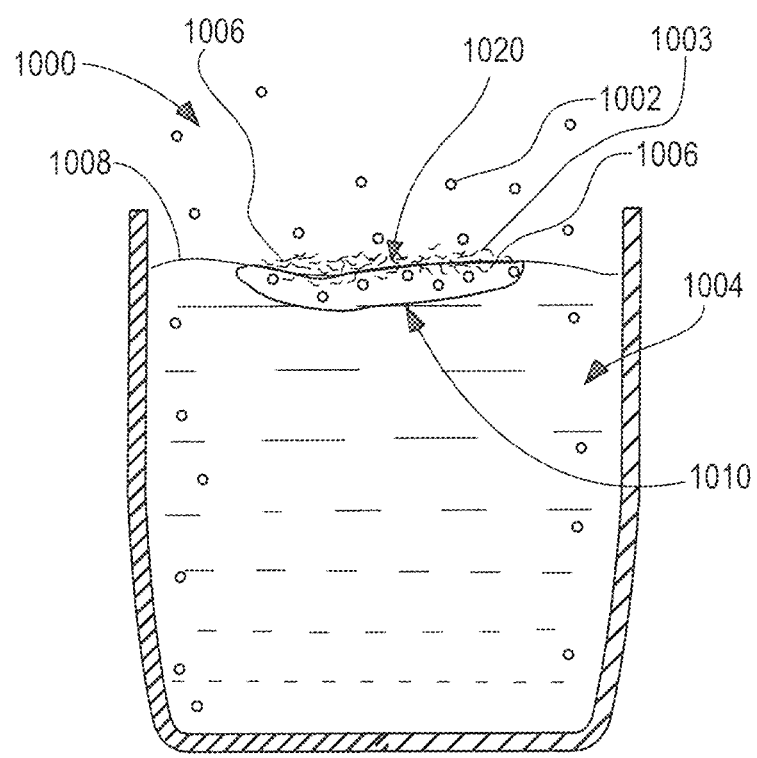
FIG. 14 is side view of magnetizable particles and absorbents introduced into an oil spill in water according to one embodiment of the present invention.

A system 1000 is illustrated in FIG. 14 that includes magnetizable particles 1002, absorbent 1003 and oil 1006 dispersed in water 1004. An absorbent 1003 is a material that has the ability to carry a certain amount of liquid in its interstice. An absorbent 1003 may be any fiber, foam, powder, grain, liquid, or solid that takes in liquid when liquid is encountered. One type of absorbent is known as a hydrophobic absorbent 1003 which are generally less susceptible to taking on water and can be used for cleaning oil spills. Different, types of absorbents 1003 can include humic substances, dry coconut shell fibers, peat moss, hay, sawdust, ground corncobs, feathers and other readily available carbon-based products.

The type of magnetizable particles 1002 that can be used in system 1000 may also vary. For example, the magnetizable particles 1002 may include an electrolytic iron oxide that is formed through the process of electrolysis. Because of the electrolysis process, these types of magnetic particles can be highly effective in absorbent systems due to their generally high magnetic susceptibility and a strong, affinity to dry absorbent.

Referring to FIG. 14, the magnetizable particles 1002, the absorbent 1003, and the oil 1006 combine to form an absorbent mixture 1020. Once formed, the absorbent mixture 1020 can be controlled or moved through the use of a magnetic field.

Various applications exist for using the magnetizable absorbent mixture 1020 and can include the identifying, separating, lifting, raising, or otherwise transporting of the absorbent mixture 1020. These applications can occur in many different ways, including tar the removal of oil from contaminated groundwater, lakes, oceans, rivers and the like. Similarly, use of this invention can also apply to other possibly more dense or porous landscapes such as marshes, swamps, and bogs where additional threes may exist. This invention may also apply to surface applications, such as soil, sand, grass, gravel, concrete, and asphalt.

The amount of magnetizable particles 1002 and absorbent 1003 needed for these applications may depend on many factors such as the amount of oil 1006 present, the strength of the magnetic force, and other environmental conditions. In one example, this amount should be enough to provide an attractive force with respect to the magnetic field that is greater than the other opposing forces. In another example, the amount of absorbent 1003 to magnetizable particles 1002 is a ratio of 100:1 by volume. In addition, when combined to form an absorbent mixture, the magnetizable particles may be sized on the micron scale or nano scale.

Many forces, operating individually and in combination, assist in forming and maintaining the absorbent mixture 1020. These include electrostatic, adhesion, Van der Waals, absorption, and magnetic forces. As described herein, Van der Waals forces are used in forming the bond between magnetic particles 1002 and oil 1006 to form a colloidal mixture 1010.

The absorption force is the force the absorbent 1003 exerts on the oil 1006 or a colloidal, mixture 1010 (the absorbate), at the surface of the water 1008. The absorption force can vary depending on the viscosity of the oil 1006 or colloidal mixture 1010 as well as the density and capillary action associated with the absorbent 1003. As discussed herein, the absorption force is sufficient, to draw the oil 1006 or colloidal mixture 1010 into the absorbent 1003.

Electrostatic forces are the forces between the magnetizable particles 1002 that are caused by their electric charges. If the two charges have the same polarity, the electrostatic force between them is repulsive. If they have different polarities, the force between them is attractive. Accordingly, within system 1000 magnetizable particles 1002 can attract and repel one, another and the absorbent 1003 by way of this electrostatic force. Electrostatic forces assist is forming and maintaining the absorbent mixture 1020 by trapping the absorbent 1003 between the magnetizable particles 1002.

Adhesive forces are attractive forces between unlike molecules. In this system 1000, the adhesive forces exist between the absorbent 1003 and magnetizable particles 1002. This adhesive force can generally be strong enough to hold the magnetizable particles 1002 to the absorbent 1003 due to the non-polar nature of the absorbents 1003. The adhesion, force of magnetizable particles 1002 to absorbent 1003 can also depend on the size of the magnetizable, particles 1002 and the, surface of the absorbent 1003.

Magnetic forces associated with the magnetizable particles 1002 also can exist in system 1000 for forming and maintaining the absorbent mixture 1020. Each particle 1002 is essentially a tiny dipole which serves as a small magnetic domain in the presence of an external magnetic field.. This provides an additional force to assist in forming and maintaining the absorbent mixture 1020 and permits control of the absorbent mixture 1020.

When the magnetizable particles 1002 are dispersed in the absorbent 1003 they are for the most part randomly distributed. In the presence of an applied magnetic field, the magnetizable particles will attempt to align themselves with the direction of the magnetic field since each magnetizable particle 1002 is a small dipole magnet in the presence of an external magnetic field. As the magnetizable particles 1002 realign themselves, adjacent absorbent fibers are also pulled into alignment due to electrostatic and adhesive forces. In addition to aligning with the external field, the magnetizable particles 1002 also attract one another. The attraction between the magnetizable particles 1002 pulls absorbent fibers adjacent to the magnetizable particles 1003 together. This alignment and compaction add rigidity to the absorbent mixture 1020 which enhances its viscosity and allows greater control over the absorbent mixture 1020, e.g. allowing the absorbent mixture to be lifted from the water surface 1008 or from other surfaces.

Referring again to FIG. 14, the system 1000 includes a magnetizable absorbent mixture 1020 of oil 1006, magnetizable particles 1002, and absorbent 1003 which can be control led by external magnetic threes. In, one example, the absorbent 1003 is combined with magnetizable particles 1002 before being dispersed onto the oil 1006 and water 1004. This method of blending generally results in a more uniform distribution of magnetizable particles 1002 throughout the absorbent 1003 and allows the absorbent mixture 1020 to be evenly controlled by an external magnetic force. A blended and premixed absorbent combination of magnetizable particles 1002 and absorbent 1003 can also be used to for distribution upon and the cleaning of oil 1006.

In one embodiment, it is desired to use an absorbent 1003 which is dry and less susceptible to collecting moisture. This dryness will allow the magnetizable particles 1002 to attach to the fibers of the absorbent 1003 in a way which enhances the electrostatic force and bonding efficiency. Accordingly, the present invention also contemplates various methods for drying the absorbent 1003 prior to use so as to maximize bonding strength and efficiency including both synthetic drying using tools or machinery and organic solar drying In one example, humus can be an effective absorbent 1003 as it is an ion exchanger. Ionic exchangers generally repel polar fluids such as water and absorb many non-polar fluids such as blood, oil, or other substances. Electrolytic iron oxide, formed through the process of electrolysis, is also effective as a magnetizable particle 1002 as it has a high magnetic susceptibility and a strong affinity to dry humus. This combination of humus 1003 and electrolytic iron oxide 1002 increases the effectiveness of the bond and thus enhances the absorbent mixture's properties. As such, the volumetric ratio of humus 1003 to electrolytic iron oxide for cleaning an oil spill can be 25:1 which is a factor of 4 lower than other oxides. This advantage permits the more efficient cleaning of oil with a less amount of humus 1003.

Humus is also an effective absorbent 1003 as the absorbency of humus is not affected through the addition of other oxide particles. Thus, when the humus 1003 is in combination with the electrolytic iron oxide 1002, the oxide particles form a weak bond with the hydrocarbons which lead to an additional enhancement when cleaning oil spills as well as other chemicals and substances.

Another advantage to the humus 1003 is that in combination with magnetite, the mixture is stable in both fresh or saltwater as magnetite is a stable oxide which is less susceptible to oxidation to form rust while the use of humus is advantageous in that it assists in repelling water.

An additional advantage of this combination is that the magnetizable absorbent mixture 1020 can facilitate the collection of oil 1006 even after the absorbent mixture 1020 has reached its saturation limit. For example, even if the absorbent mixture 1020 reaches its saturation limit, the magnetic particles 1002 remain bonded and attracted to any additional oil located generally proximal to the absorbent mixture 1020. Through, use of a magnetic field, this increases collection efficiency through manipulation and collection of both the absorbent mixture 1020 as well as the additional oil proximate the absorbent mixture 1020.

Given the strength of this combination, another benefit allows for the use of a magnetic field to collect and recover saturated magnetic absorbent mixture 1020 that may have sunk downwardly through the water after absorbing particularly heavy hydrocarbons such as tar sand oils.

In another example, magnetizable particles 1002 are dispersed into the system 1000 before the absorbent 1003. Here, the magnetizable particles 1002 seed the oil 1006 creating a colloidal mixture 1010 as previously described. Absorbent 1003 is then introduced in the system 1000, and the colloidal mixture 1010 and any remaining surface oil 1006 is formed into an absorbent mixture 1020. External magnetic forces can then be used to control and manipulate the absorbent mixture 1020. In one example, oil 1006 located below the surface of the water 1004 may also be combined to form the absorbent mixture 1020 if it is within reach of the magnetic field or in contact with the absorbent 1003.

A magnetic field can be used to lift the absorbent mixture 1510 from a surface as shown in FIGS. 15A-15B. Referring to FIGS, 15A-15B, a system 1500 includes magnetizable particles 1502, oil 1506, and absorbent 1503. As described herein, the resulting absorbent mixture 1510 is disposed on the surface of the water 1504. In this example, a magnet 1516 exerts a magnetic force 1514 that lifts the absorbent mixture 1510 away from the water 1504 and toward the magnet 1516. In water 1506, both the magnetic force 1514 and water surface tension force facilitates the lifting of the absorbent mixture 1510.

Figure 16:
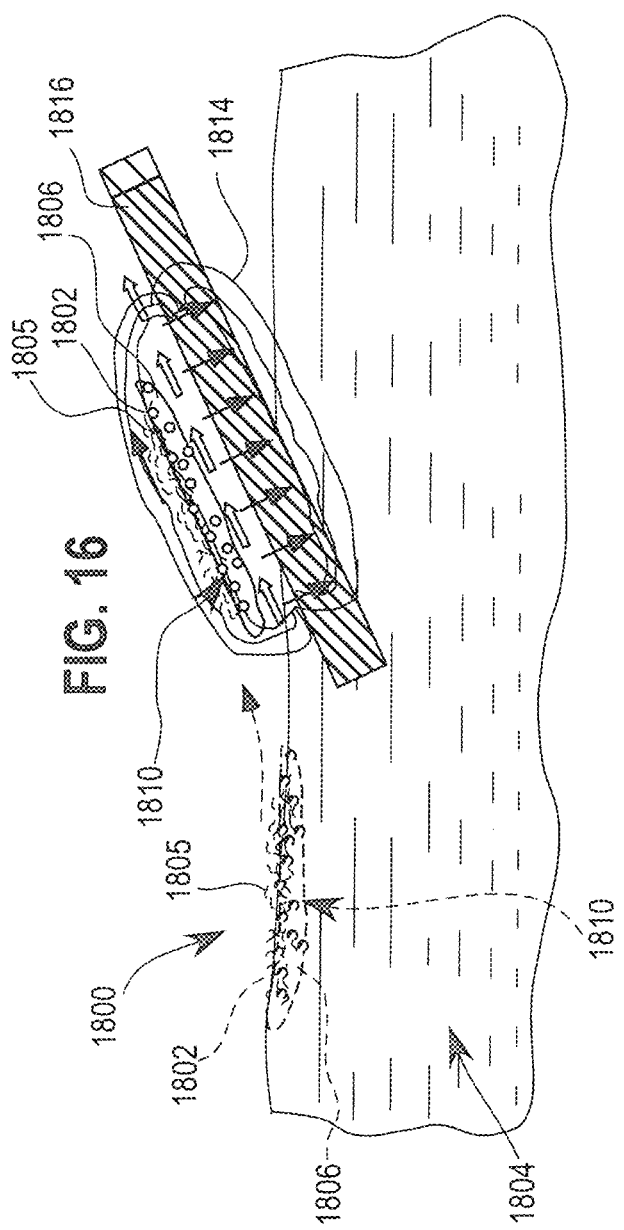
FIG. 16 is a side view of a system having magnetizable particles and absorbents disposed in oil and an interaction with a magnetic field according to one embodiment of the present invention.

FIG. 16 illustrates a system 1800 for removing an absorbent mixture 1810 composed of oil 1806, magnetizable particles 1802, and absorbent 1805 from water 1804. A magnet 1816 creates a magnetic field 1814 for attracting the absorbent mixture 1810. In this example, the magnet 1816 is disposed at the water 1804 in an inclined configuration. Accordingly, the magnetic field 1814 can be applied to move the absorbent mixture 1810 up the inclined configuration for removal from the system 1800. As a result of the angle of inclination and the hydrophobic nature of the materials, the system 1800 does not collect water 1804 which increases efficiency of collecting oil 1806.

Figure 17:
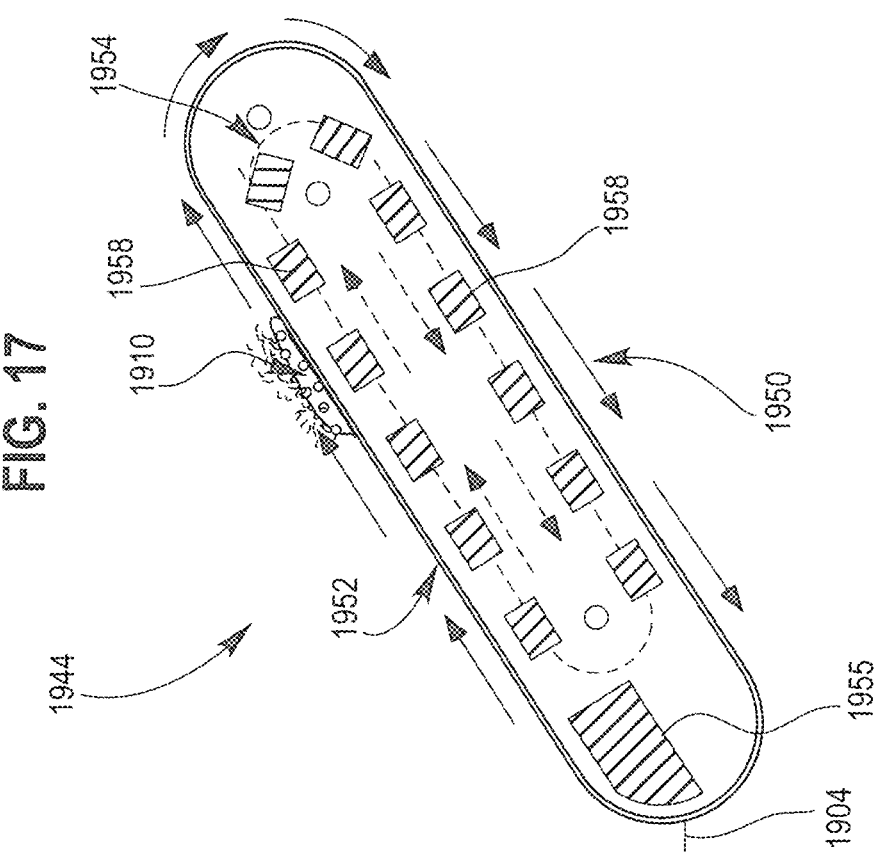
FIG. 17 illustrates a system for magnetically moving and manipulating an absorbent mixture according to one embodiment of the present invention.

As described herein, the electromagnetic pulsed-wave system 900 can also be used to manipulate, move, or collect the absorbent mixture 1910. Referring to FIG. 17, a depository 1944 includes an electromagnetic skimmer 1950 that is used to remove the absorbent mixture 1910 from water 1904. The electromagnetic skimmer 1950 can be generally disposed in an upward and inclined configuration. The skimmer 1950 also includes an electric dipole magnet 1955 disposed proximate to the interface of the water 1904 and skimmer 1950 so as to facilitate transfer of the absorbent mixture 1910.

The electromagnetic skimmer 1950 also includes a rotating outer belt 1952 and a rotating permanent magnet belt 1954. The rotating outer belt 1952 can be made of urethane, austenitic stainless steel, or other non-magnetic materials. Both belts 1952 and 1954 can rotate continuously about the electromagnetic skimmer 1950 and can be configured to move at different relative speeds. The rotating permanent magnet belt 1954 includes a plurality of magnets 1958 that are located interior to the rotating outer belt 1952. These magnets 1958 can apply a magnetic force to facilitate control and attraction of the absorbent mixture 1910 disposed on the outer rotating belt 1952. Since the speed of the rotating permanent magnet belt 1954 can be adjusted, the magnetic force created by the magnets 1958 can vary in direction and scope.

Referring to FIG. 18, a collection ramp 2050 includes a magnetic rail 2054 and a rotating belt 2052 can also be used to move the absorbent mixture 2010 to a storage container 2048. The collection ramp 2050 can be generally disposed in upward and inclined configuration, a downward and declined configuration, or a horizontal configuration.

The belt 2052 can rotate continuously about the collection ramp 2050 and can be configured to move at different speeds. The permanent magnet rail 2054 is located interior to the rotating belt 2052. This magnet rail 2054 can apply a magnetic force to facilitate control and attraction of the absorbent mixture 2010 disposed on the rotating belt 2052.

The collection ramp 2050 also forms an outlet section 2056 Where the absorbent mixture 2010 can exit to a storage container 2048. The outlet section 2056 is positioned within the collection ramp 2050 so as to be affected by little to generally no magnetic force. When the carried absorbent mixture 2010 reaches the outlet section 2056, it is able to exit to the storage container 2048 under the force of gravity. Any remaining absorbent mixture 2010 adhering to the rotating belt 2052 passes between a roller 2058 and a scraper blade 2060. The scraper blade 2060 is in contact with outer surface of the rotating belt 2052. The scraper blade 2060 wipes the absorbent mixture 2010 off the rotating belt 2052 and it drops to the storage container 2048 under the force of gravity.

Once in the storage container 2048, the absorbent mixture 2010 can be recycled and reused. In one example, the absorbent mixture 2010 can also be incinerated. At high temperatures, the magnetizable particles are combustible, and thus enhances the efficiency for burning absorbent mixture 1020.

It is understood that the exemplary system and method described herein and shown in the drawings represent only presently preferred embodiments of the invention. Various modifications and additions may be made to such embodiments without departing from the spirit and scope of the invention.

What is claimed:

1. A method of controlling an oil spill which comprises the steps of:
   introducing a plurality of electrolytic iron oxide particles into the oil spill in an amount sufficient to form a colloidal mixture;
   introducing an absorbent into the oil spill and colloidal mixture to form an absorbent mixture comprising the colloidal mixture, the absorbent, and oil from the oil spill;
   applying a magnetic field to the absorbent mixture; and
   moving the absorbent mixture in response to movement of the magnetic field.

2. The method of claim 1 wherein the ratio of absorbent to electrolytic iron oxide particles in the absorbent mixture is 25:1 by volume.

3. The method of claim 1 wherein the absorbent mixture is formed as a result of an electrostatic force between the electrolytic iron oxide particles and the absorbent.

4. The method of claim 1 wherein absorbent mixture is formed as a result of an adhesion force between the electrolytic iron oxide particles and the absorbent.

5. The method of claim 1 wherein the magnetic field is used to lift the absorbent mixture in a direction away from a surface.

6. The method of claim 1 wherein the oil from the oil spill is disposed in an aqueous solution that acts as a transport medium for the absorbent mixture.

7. The method of claim 1 wherein each of the plurality of electrolytic iron oxide particles are sized on the micron-scale.

8. The method of claim 1 wherein each of the plurality of electrolytic iron oxide particles are sized on the nano-scale.

9. There method of claim 8 wherein the colloidal mixture is formed as a result of a bond between the plurality of electrolytic iron oxide particles and oil from the oil spill.

10. The method of claim 9 wherein the bond is at least partially formed from atomic forces.

11. The method of claim 1 wherein the absorbent is a hydrophobic absorbent.

12. The method of claim 1 wherein the absorbent is dried prior to introduction into the oil spill.

* * * * *